US012763458B2

(12) United States Patent
Matsumura et al.

(10) Patent No.: US 12,763,458 B2
(45) Date of Patent: Oct. 13, 2026

(54) VEHICULAR ANTENNA DEVICE

(71) Applicant: YOKOWO CO., LTD., Tokyo (JP)

(72) Inventors: Shuta Matsumura, Gunma (JP); Masashi Noda, Gunma (JP); Minoru Arata, Gunma (JP)

(73) Assignee: YOKOWO CO., LTD., Tokyo (JP)

( * ) Notice: Subject to any disclaimer, the term of this patent is extended or adjusted under 35 U.S.C. 154(b) by 42 days.

(21) Appl. No.: 18/840,924

(22) PCT Filed: Feb. 16, 2023

(86) PCT No.: PCT/JP2023/005372
§ 371 (c)(1),
(2) Date: Aug. 23, 2024

(87) PCT Pub. No.: WO2023/162843
PCT Pub. Date: Aug. 31, 2023

(65) Prior Publication Data

US 2025/0192424 A1 Jun. 12, 2025

(30) Foreign Application Priority Data

Feb. 25, 2022 (JP) ................................ 2022-027404

(51) Int. Cl.
*H01Q 1/42* (2006.01)
*H01Q 1/32* (2006.01)

(52) U.S. Cl.
CPC ............ *H01Q 1/42* (2013.01); *H01Q 1/3275* (2013.01)

(58) Field of Classification Search
CPC .......... H01Q 1/3275; H01Q 1/22; H01Q 9/30; H01Q 21/28; H01Q 1/32
(Continued)

(56) References Cited

U.S. PATENT DOCUMENTS 8,269,680 B2 * 9/2012 Oki ...................... H01Q 1/3275 343/788
9,225,055 B2 * 12/2015 Kaneko ................ H01Q 1/3275
(Continued)

FOREIGN PATENT DOCUMENTS

JP 2015-084575 A 4/2015
WO WO-2020235388 A1 * 11/2020 .............. H01Q 1/22

OTHER PUBLICATIONS

May 16, 2023, International Search Report issued for related PCT Application No. PCT/JP2023/005372.
(Continued)

*Primary Examiner* — Dameon E Levi
(74) *Attorney, Agent, or Firm* — Paratus Law Group, PLLC

(57) ABSTRACT

A vehicular antenna device includes: an antenna element portion including an antenna element; an element holder holds the antenna element; and a case covers at least the antenna element and the element holder. The antenna element includes at least one of a slit and a slot extending in a second direction perpendicular to a first direction in which the element holder and the case sandwich the antenna element. A projection is provided on an inner wall of the case. A part of a region of the case in contact with the antenna element is located further toward one side in the first direction than a region where the projection is provided. A part of a region of the element holder in contact with the antenna element is located further toward the other side in the first direction than the region where the projection is provided.

8 Claims, 16 Drawing Sheets

(58) Field of Classification Search
USPC .......................................................... 343/713
See application file for complete search history.

(56) References Cited

U.S. PATENT DOCUMENTS

| | | | | |
|---|---|---|---|---|
| 9,553,365 | B2 * | 1/2017 | Lindenmeier | H01Q 5/30 |
| 10,164,327 | B2 * | 12/2018 | Nakada | H01Q 1/362 |
| 10,559,876 | B2 * | 2/2020 | Huang | H01Q 1/241 |
| 10,770,796 | B2 * | 9/2020 | Miura | H01Q 23/00 |
| 11,152,692 | B2 * | 10/2021 | Terashita | H01Q 1/521 |
| 11,600,909 | B2 * | 3/2023 | Terashita | H01Q 9/36 |
| 12,230,871 | B2 * | 2/2025 | Park | H01Q 1/3275 |
| 2016/0064807 | A1 * | 3/2016 | Reed | H01Q 21/28<br>343/749 |
| 2020/0168982 | A1 * | 5/2020 | Asuma | B60R 11/02 |

OTHER PUBLICATIONS

May 16, 2023, International Search Opinion issued for related PCT Application No. PCT/JP2023/005372.

* cited by examiner

VEHICULAR ANTENNA DEVICE

CROSS REFERENCE TO PRIOR APPLICATION

This application is a National Stage Patent Application of PCT International Patent Application No. PCT/JP2023/005372 (filed on Feb. 16, 2023) under 35 U.S.C. § 371, which claims priority to Japanese Patent Application No. 2022-027404 (filed on Feb. 25, 2022), which are all hereby incorporated by reference in their entirety.

TECHNICAL FIELD

The present invention relates to a vehicular antenna device.

BACKGROUND ART

In the related art, as disclosed in Patent Literature 1, a vehicular antenna device (onboard antenna device) including a structure for holding an antenna element has been proposed.

CITATION LIST

Patent Literature

Patent Literature 1: JP2015-084575A

SUMMARY OF INVENTION

Technical Problem

However, stable holding of the antenna element is not sufficient. For example, a region of the antenna element away from a held portion may be moved by vibration or the like.

An object of the present invention is to stably hold an antenna element of a vehicular antenna device.

Solution to Problem

A vehicular antenna device according to the present disclosure includes an antenna element portion including an antenna element, an element holder configured to hold the antenna element, and a case configured to cover at least the antenna element and the element holder. The antenna element is sandwiched between the element holder and the case. The antenna element includes at least one of a slit and a slot extending in a second direction perpendicular to a first direction in which the element holder and the case sandwich the antenna element. A projection to be inserted into the at least one of the slit and the slot is provided on an inner wall of the case. At least a part of a region of the case in contact with the antenna element is located further toward one side in the first direction than a region where the projection is provided. At least a part of a region of the element holder in contact with the antenna element is located further toward the other side in the first direction than the region where the projection is provided.

Advantageous Effects of Invention

As described above, according to the present invention, the antenna element of the vehicular antenna device can be stably held.

DESCRIPTION OF EMBODIMENTS

Hereinafter, the present embodiment will be described with reference to the drawings. Embodiments are not limited to the following embodiments. Further, contents described in one embodiment are similarly applied to other embodiments in principle. Further, the embodiments and modifications can be appropriately combined.

First Embodiment

Figure 1:
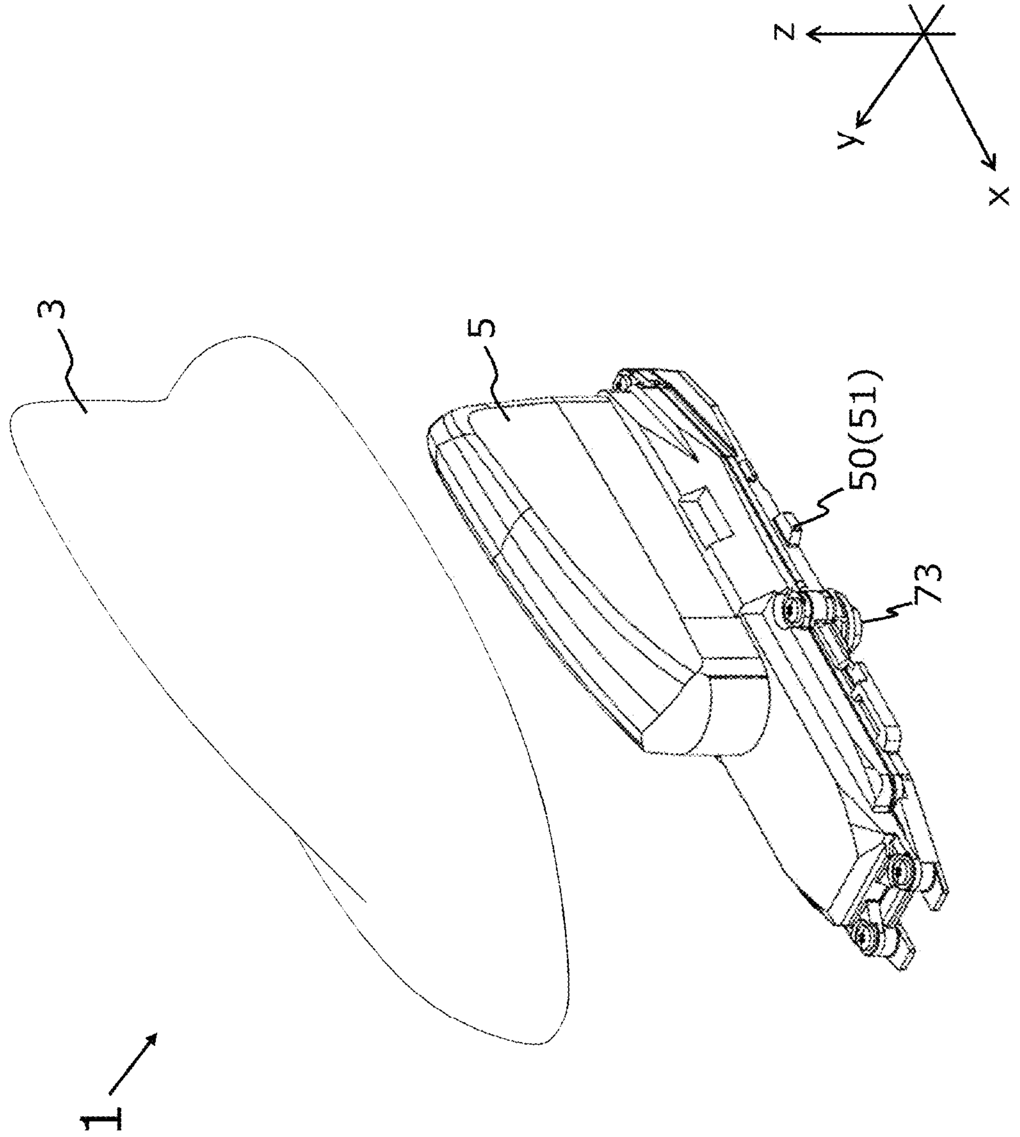
FIG. 1 is a perspective view showing a state before an assembly of a case and a base portion and an exterior cover are attached in a first embodiment, when viewed from an upper front side.
Figure 2:
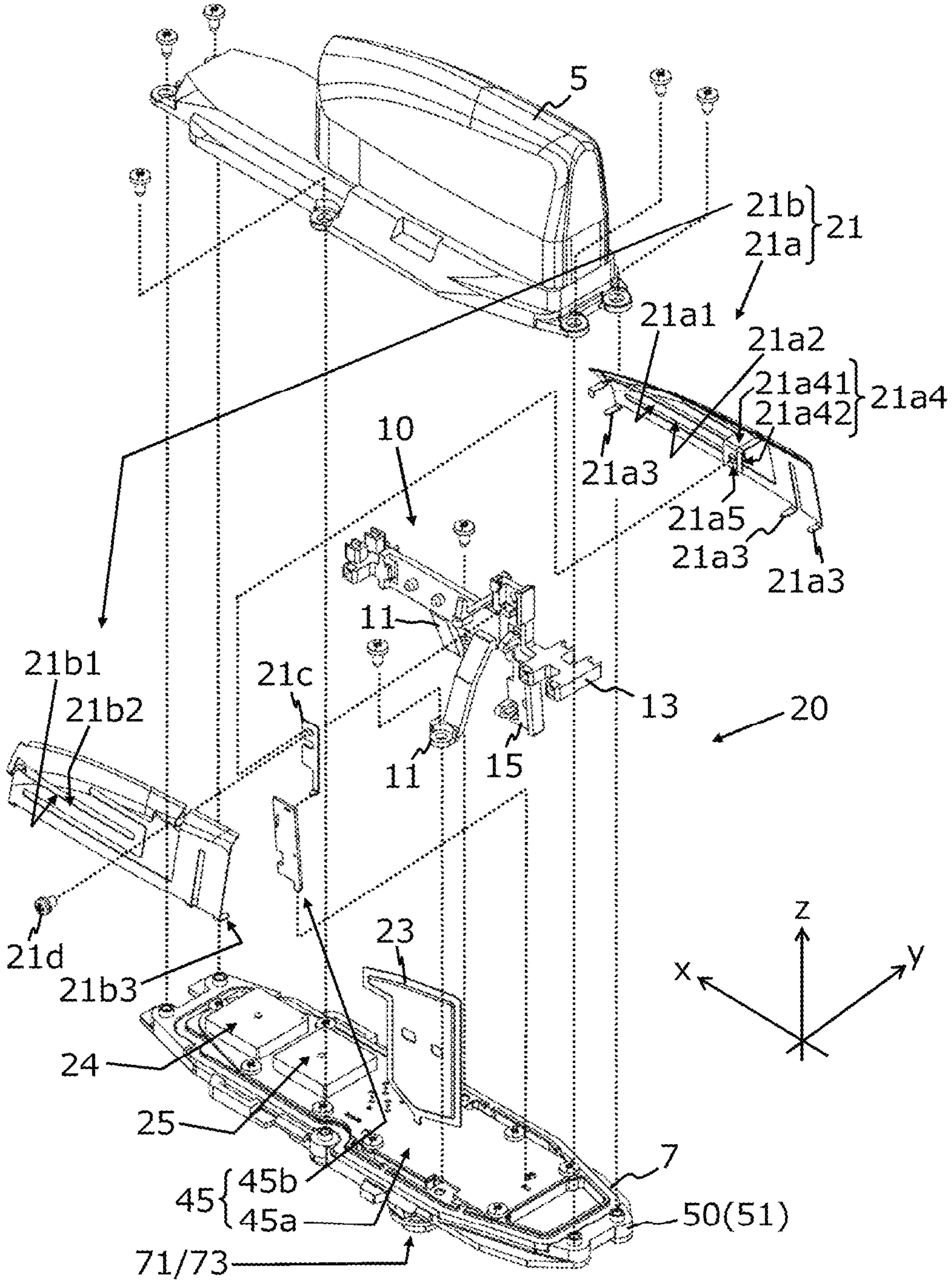
FIG. 2 is a perspective view showing a state before the case, a first antenna, and an element holder are attached to a first substrate and the base portion in the first embodiment, when viewed from an upper rear side.
Figure 3:
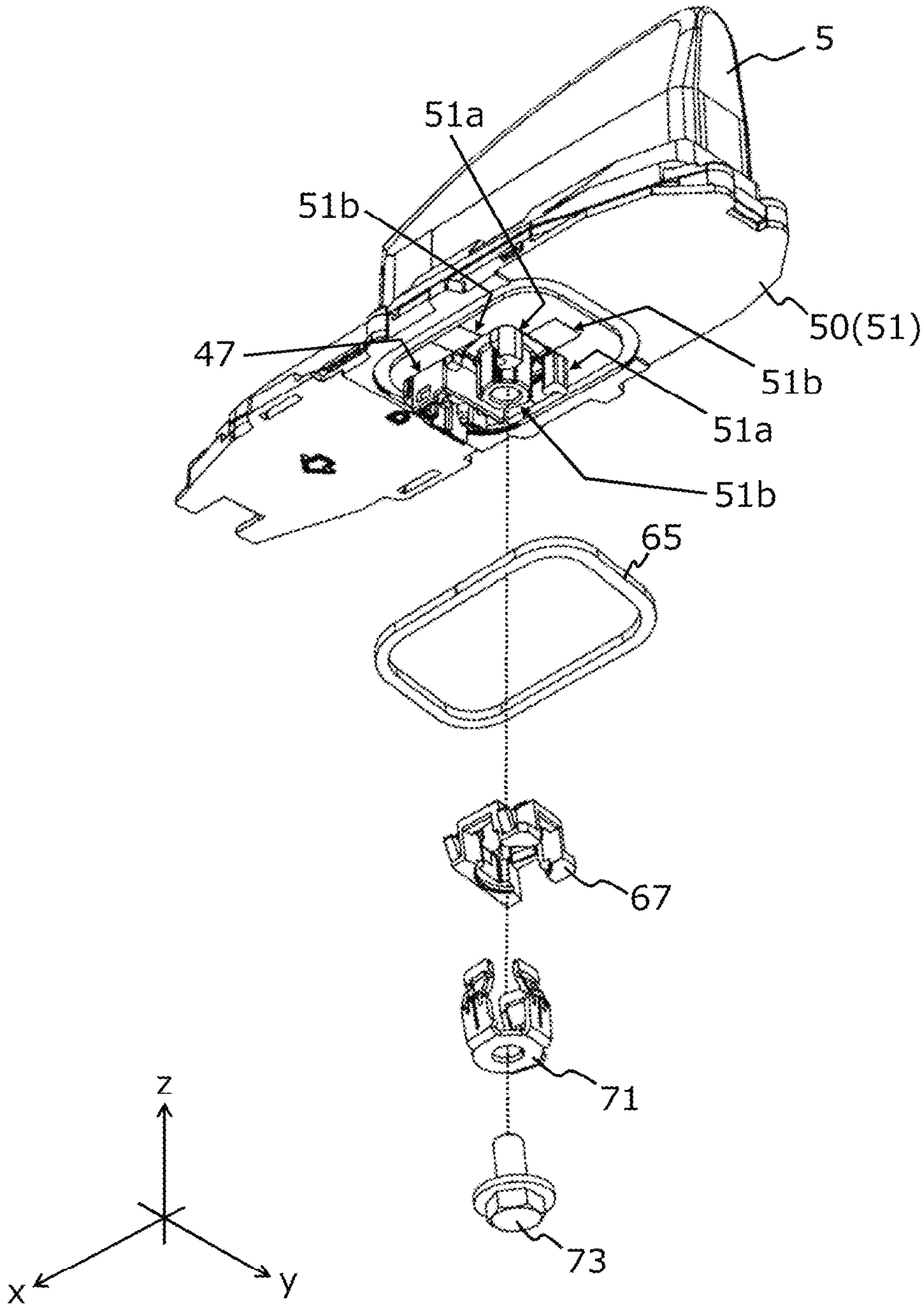
FIG. 3 is a perspective view showing a state before a waterproof member, a temporary fixing tool, a claw-equipped washer, and a bolt are attached to the assembly of the case and the base portion in the first embodiment, when viewed from a lower rear side.

A vehicular antenna device 1 of a first embodiment is attached to an upper surface of a vehicle such as a roof. For example, as shown in FIGS. 1 to 3, the vehicular antenna device 1 includes an outer cover 3, a case 5, a pad 7, an element holder 10, an antenna element portion 20, a substrate portion 45, a connector 47, a base portion 50, a waterproof member 65, a temporary fixing tool 67, a claw-equipped washer 71, and a bolt 73.

In the following description, in order to describe directions, a front-rear direction of the vehicle to which the vehicular antenna device 1 is attached is defined as an x direction, a left-right direction perpendicular to the x direction is defined as a y direction, and a substantially vertical direction perpendicular to the x direction and the y direction is defined as a z direction. In FIG. 1, the directions indicated by respective arrows of xyz axes are defined as a forward direction, a rightward direction, and an upward direction.

Outer Cover 3

The outer cover 3 is made of a synthetic resin having radio wave transparency. For example, the outer cover 3 is inclined such that a front side thereof in the x direction is lower than a rear side in the x direction, and has a shark-fin shape in which both side surfaces are curved inward. The outer cover 3 has an open lower surface and covers the case 5, the antenna element portion 20, or the like from an upper side in the z direction. The outer cover 3 is attached to the base portion 50 by snap fitting or the like. A pad (not shown) is provided between the outer cover 3 and the roof of the vehicle. The illustration of the outer cover 3 is omitted except for FIG. 1. The outer cover 3 may be omitted and the case 5 may be exposed.

Further, the case 5 or the like may be provided inside a region of the roof of the vehicle raised upward in the z direction. In this case, the outer cover 3 is omitted, and the base portion 50 and the like are attached to an inner panel or the like of the vehicle.

Pad 7

The pad 7 is an annular elastic member made of elastomer, rubber, or the like. The pad 7 is sandwiched between a lower end peripheral edge portion of the case 5 and the base portion 50. The pad 7 prevents water from entering a space between the case 5 and the base portion 50.

Connector 47

The connector 47 is mounted on a lower surface of a first substrate 45*a*. The connector 47 penetrates a hole of a metal base 51 and protrudes downward in the z direction. The connector 47 is electrically connected to a cable (not shown) extending from an electrical device (such as an audio device, not shown) of the vehicle.

Base Portion 50

A base portion 50 of the first embodiment is implemented by the metal base 51. The metal base 51 is used as a ground plate of the vehicular antenna device 1. However, as described in a second embodiment and a third embodiment, the base portion 50 may include a metal plate 52 that is thinner than the metal base 51, and a resin base 55 that holds the metal plate 52. The metal base 51 holds the element holder 10 and the first substrate 45*a* (see FIG. 2).

In a region of a lower surface of the metal base 51 facing an attachment hole of the roof of the vehicle, a rotation stop portion (first rotation stop portion 51*a*) protruding downward in the z direction and passing through the attachment hole is provided (see FIG. 3). The first rotation stop portion 51*a* is integrally formed with the lower surface of the metal base 51. The first rotation stop portion 51*a* comes into contact with a corner region of the attachment hole of the roof of the vehicle, and prevents rotation of the base portion 50 by rotation of the bolt 73.

A flat surface region is formed on the lower surface of the metal base 51 between a region facing the attachment hole of the roof of the vehicle and a region to which the waterproof member 65 is attached. When the vehicular antenna device 1 is fixed to the roof of the vehicle, the flat surface region (first roof contact surface 51*b*) is in contact with the roof.

Waterproof Member 65

A waterproof member 65 such as a seal is attached to the lower surface of the metal base 51 in the periphery of the first rotation stop portion 51*a*. The waterproof member 65 is an elastic member having a surrounding shape formed of elastomer, rubber, urethane foam, or the like. The waterproof member 65 watertightly seals the periphery of a region between the metal base 51 and the roof of the vehicle where the attachment hole of the roof of the vehicle is provided.

Temporary Fixing Tool 67

The temporary fixing tool 67 is made of a resin, and is attached to the lower surface of the metal base 51 in a region facing the attachment hole of the roof of the vehicle. The temporary fixing tool 67 is used for hooking (temporary tacking) to the roof of the vehicle before fastening the bolt 73.

Claw-Equipped Washer 71 and Bolt 73

The claw-equipped washer 71 is deformed when the bolt 73 is fastened, and is in contact with a lower surface of the roof of the vehicle and the lower surface of the metal base 51.

Case 5

Figure 16:
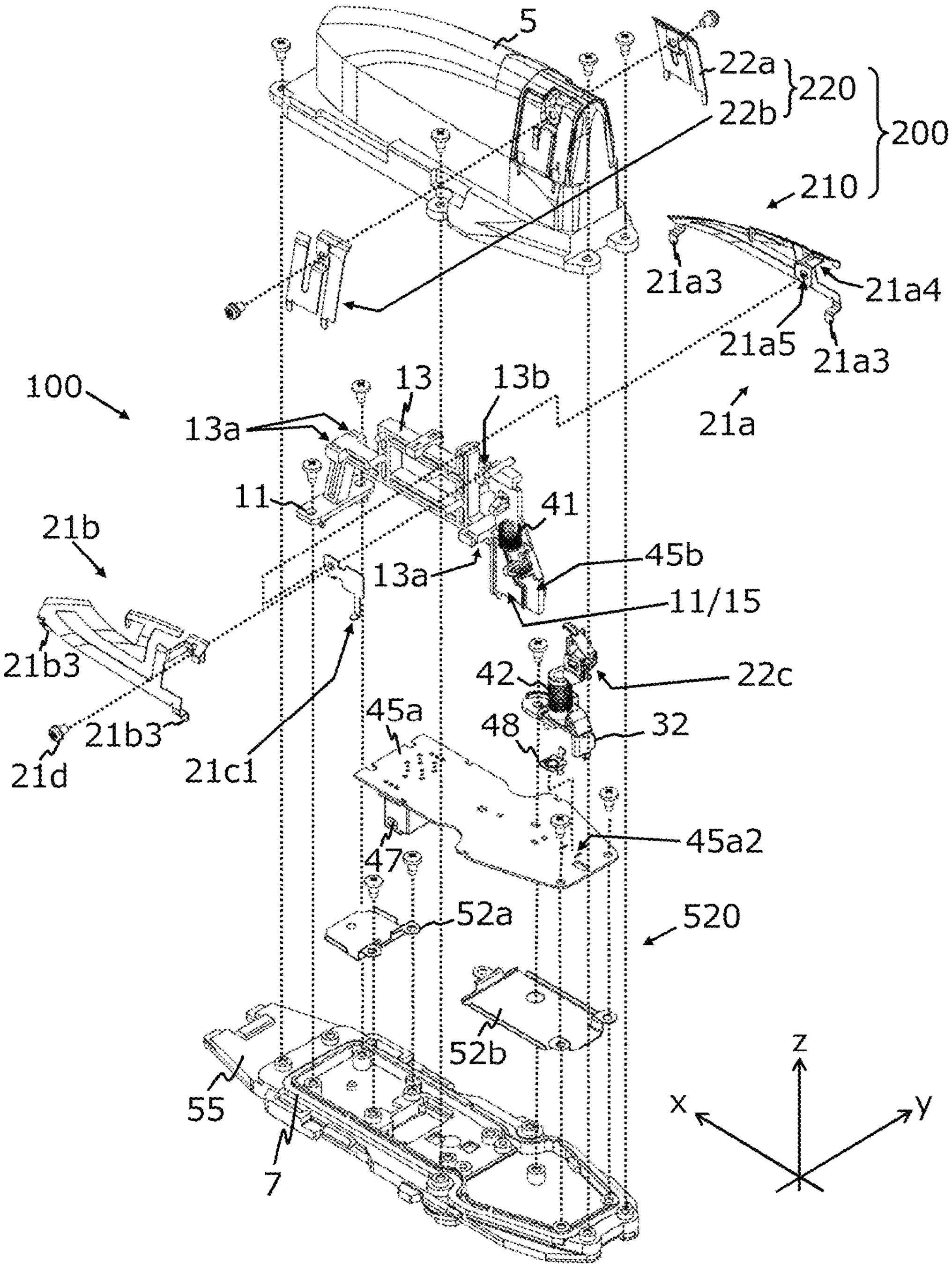
FIG. 16 is a perspective view showing a state before a case, a first antenna, a fifth antenna, an element holder, a second helical element holder, a first substrate, and a metal plate are attached to a resin base in the third embodiment, when viewed from an upper rear side.

The case 5 is made of a synthetic resin having radio wave transparency. The lower surface of the case 5 is open. The case 5 covers the element holder 10, a first antenna 21, or the like. Accordingly, the element holder 10, the antenna element portion 20, the substrate portion 45, or the like are accommodated in a region (accommodation space) surrounded by the case 5 and the base portion 50. As in a third embodiment to be described later, a part of the antenna element portion 20 (fifth antenna 220, see FIG. 16) may be provided inside the outer cover 3 and outside the case 5.

Projections 5a of Case 5

Figure 4:
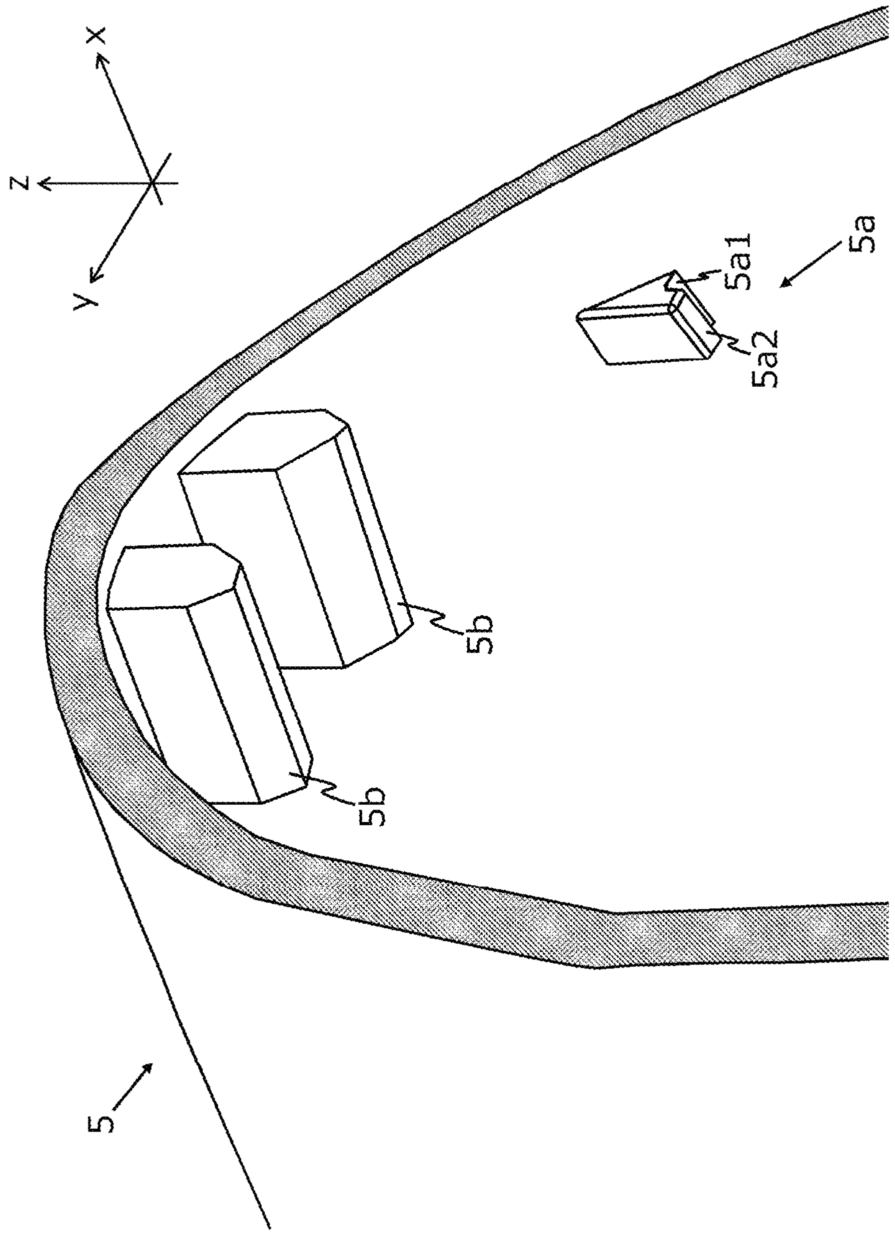
FIG. 4 is a cross-sectional perspective view of a region where an upper stopper and a side stopper of the case are present in the first embodiment.
Figure 5:
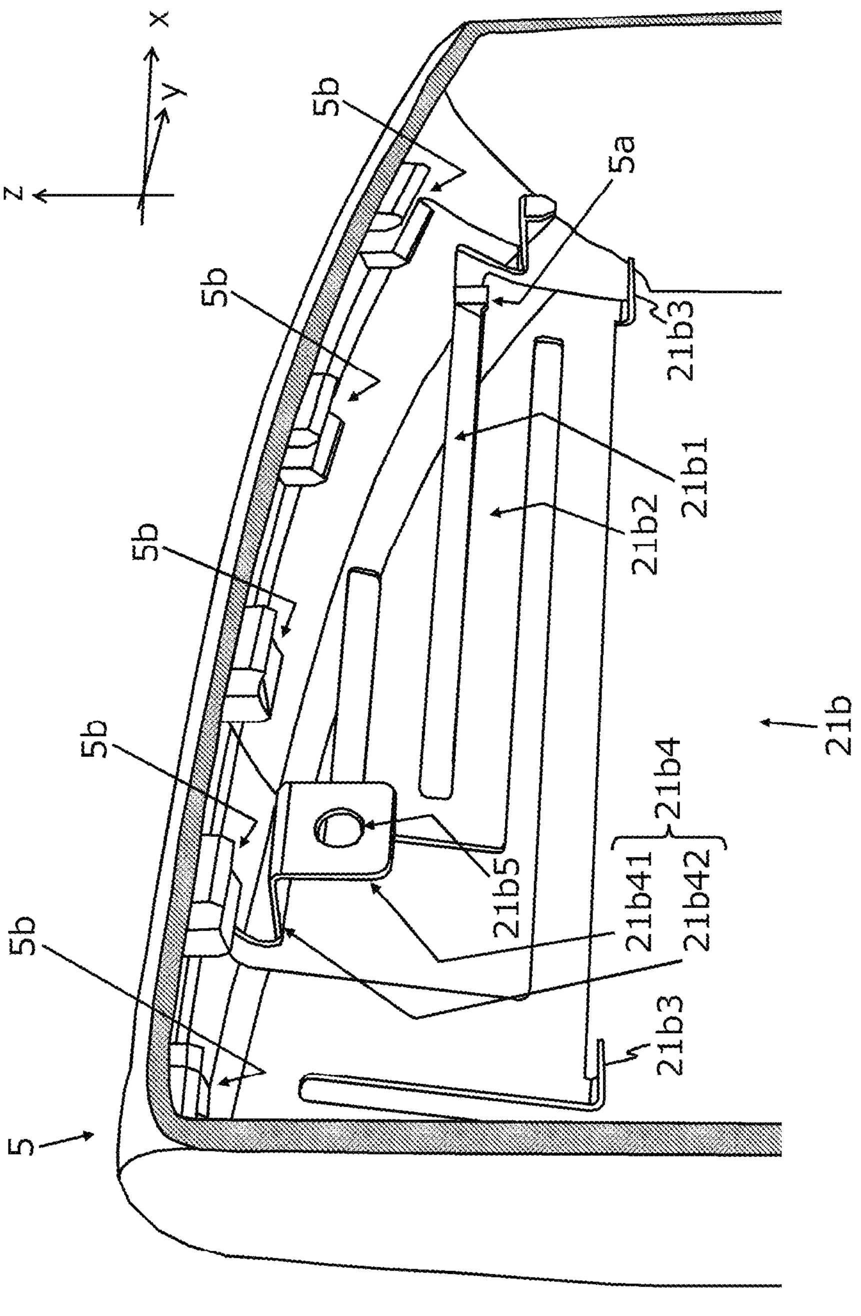
FIG. 5 is a cross-sectional perspective view of the case to which a second element is attached in the first embodiment.
Figure 6:
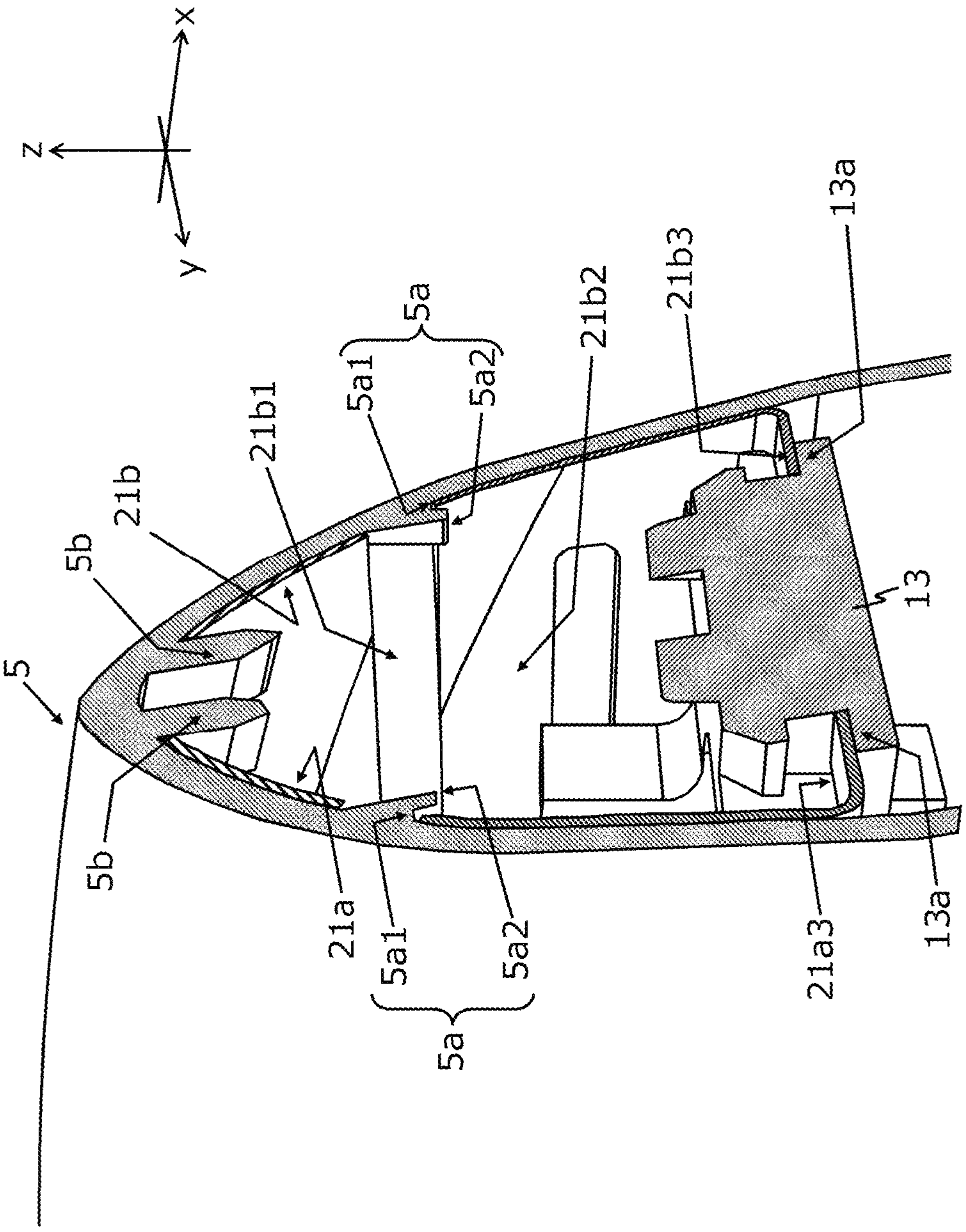
FIG. 6 is a cross-sectional perspective view of a region where an upper stopper and a side stopper of the case are present, an first element, the second element, and the element holder in the first embodiment.

As shown in FIGS. 4 to 6, a projection (side stopper) 5*a* protruding leftward in the y direction is provided on a right side portion of an inner wall of the case 5. The projection (side stopper) 5*a* protruding rightward in the y direction is provided on a left side portion of the inner wall of the case 5. The projection 5*a* on the right side portion of the inner wall of the case 5 is provided at a position facing a slit (first horizontal slit 21*a*1) of an first element 21*a* in the y direction when the case 5 is attached to the base portion 50. The projection 5*a* on the left side portion of the inner wall of the case 5 is provided at a position facing a slit (second horizontal slit 21*b*1) of a second element 21*b* in the y direction when the case 5 is attached to the base portion 50. In the first embodiment, the example in which the region into which the projection 5*a* is inserted is configured by a cut (slit) extending horizontally is shown, but the region may be configured by a hole (slot) extending horizontally.

A flat surface portion 5*a*1 substantially perpendicular to the z direction and a tip portion 5*a*2 extending downward in the z direction from a tip of the flat surface portion are formed at a lower portion of the projection 5*a*. A horizontally long region (first horizontally long region 21*a*2) of the first element 21*a* is in contact with the flat surface portion 5*a*1 of the projection 5*a* on the right side portion of the inner wall of the case 5. A horizontally long region (second horizontally long region 21*b*2) of the second element 21*b* is in contact with the flat surface portion 5*a*1 of the projection 5*a* on the left side portion of the inner wall of the case 5. The tip portion 5*a*2 of the projection 5*a* on the right side portion of the inner wall of the case 5 prevents the first horizontally long region 21*a*2 of the first element 21*a* from coming off the flat surface portion Sal. The tip portion 5*a*2 of the projection 5*a* on the left side portion of the inner wall of the case 5 prevents the second horizontally long region 21*b*2 of the second element 21*b* from coming off the flat surface portion Sal.

Convex Portion 5*b* of Case 5

Convex portions (upper stoppers) 5*b* protruding downward in the z direction are provided on an upper portion of the inner wall of the case 5. An upper end portion of the first element 21*a* is in contact with a right side portion of the convex portion 5*b*. The upper end portion of the second element 21*b* is in contact with a left side portion of the convex portion 5*b*.

Position at which Case 5 and First Element 21*a* or the Like are in Contact At least a part of a region (the convex portion 5*b*) of the case 5 in contact with the first element 21*a* or the second element 21*b* is located above the region of the case 5 where the projection 5*a* is provided in the z direction.

The right side portion of the inner wall of the case 5 restricts rightward movement of the first element 21*a* in the y direction. The left side portion of the inner wall of the case 5 restricts leftward movement of the second element 21*b* in the y direction. The projection 5*a* on the right side portion of the inner wall of the case 5 limits upward movement of the first horizontally long region 21*a*2 of the first element 21*a* in the z direction. The projection 5*a* on the left side portion of the inner wall of the case 5 limits upward movement of the second horizontally long region 21*b*2 of the second element 21*b* in the z direction. The convex portion 5*b* restricts upward movement of the first element 21*a* and the second element 21*b* in the z direction.

Element Holder 10

Figure 7:
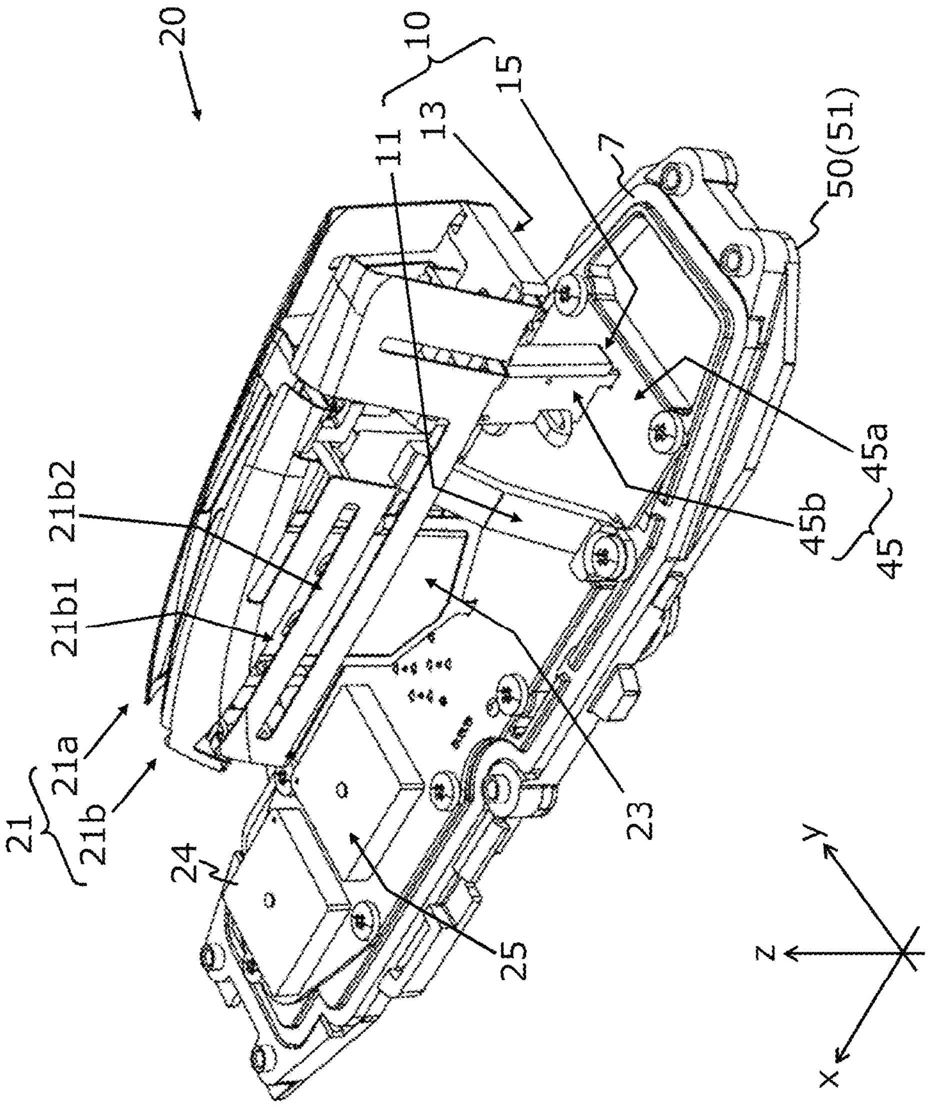
FIG. 7 is a perspective view showing a state after the first antenna, the element holder, the first substrate, and the base portion are assembled in the first embodiment, when viewed from an upper rear side.
Figure 8:
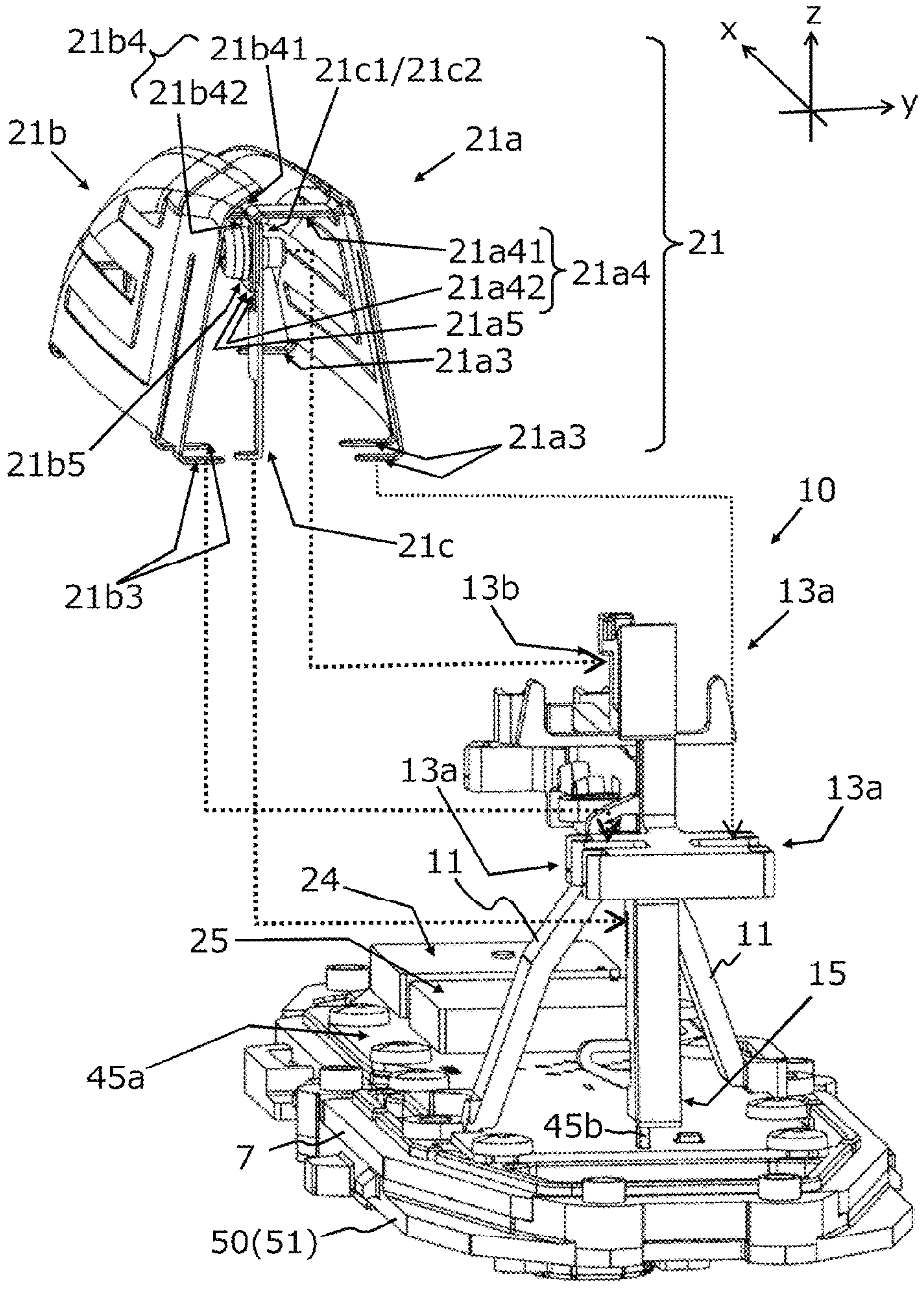
FIG. 8 is a rear perspective view showing a state before the first antenna is attached to the base portion to which the element holder and the first substrate are attached in the first embodiment.
Figure 9:
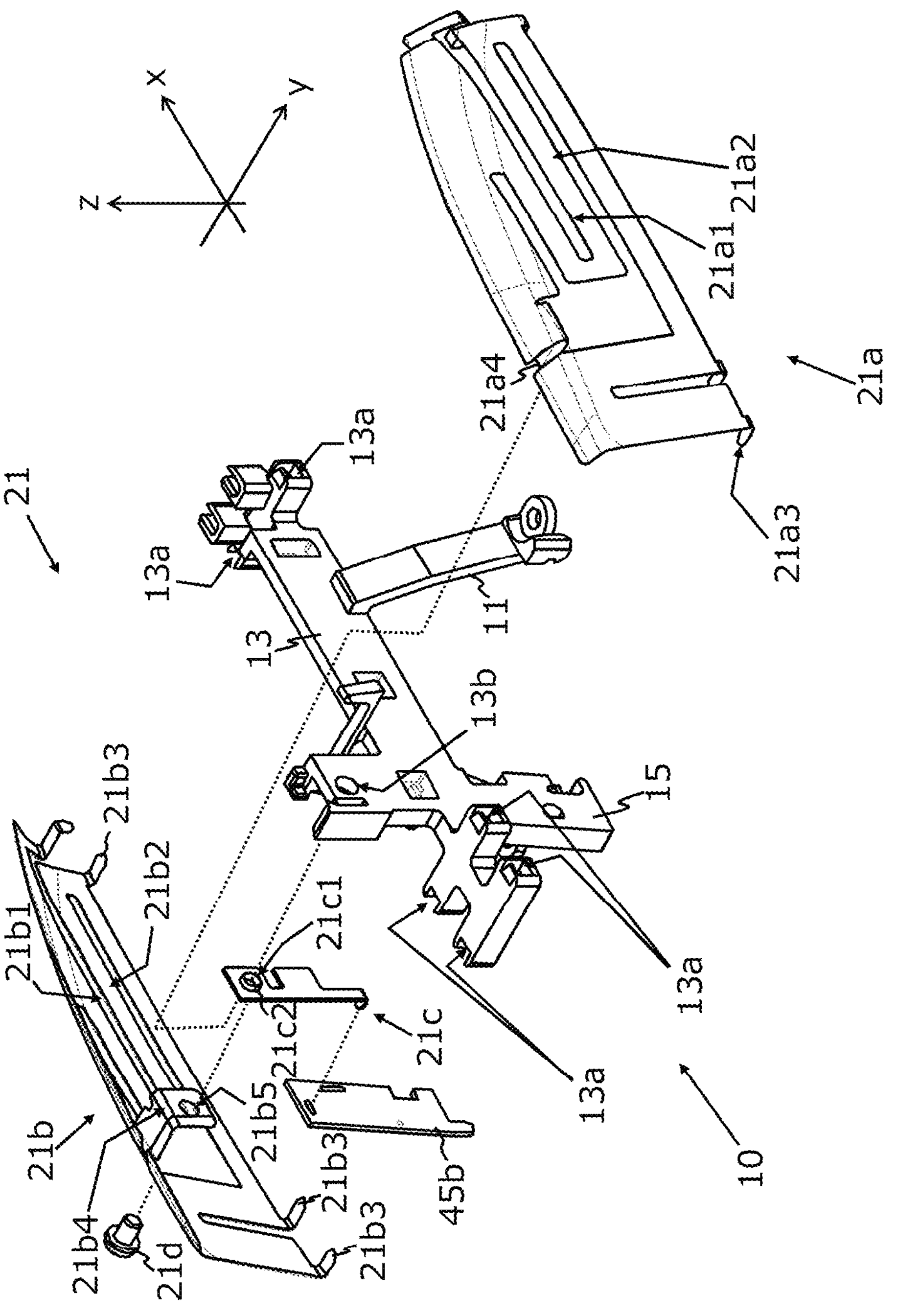
FIG. 9 is an exploded perspective view of the first antenna, the element holder, and the second substrate in the first embodiment.
Figure 10:
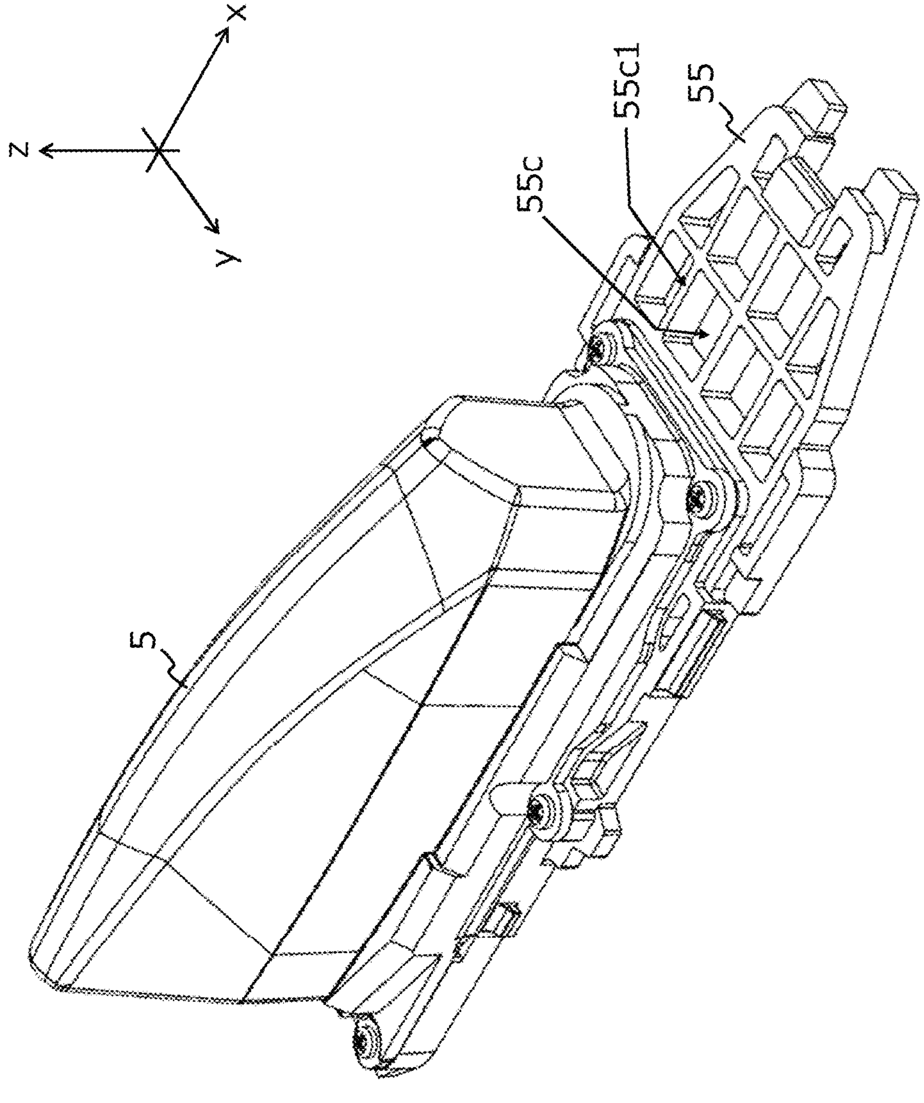
FIG. 10 is a perspective view of an assembly of a case and a base portion in a second embodiment when viewed from an upper front side.

As shown in FIGS. 7 to 9, the element holder 10 holds the first antenna 21 of the antenna element portion 20. The element holder 10 is made of a resin. The element holder 10 includes leg portions 11, a holding portion 13, and a substrate holding portion 15.

One of the leg portions 11 extends in an obliquely upper right direction when viewed from the x direction, and the other leg portion 11 extends in an obliquely upper left direction when viewed from the x direction. The leg portion 11 has a substantially inverted V shape when viewed from the x direction. A lower end of the leg portion 11 is screwed to the base portion 50 (metal base 51). The holding portion 13 is formed above the leg portion 11 in the z direction.

However, the shape of the leg portion 11 is not limited to that described above. For example, as shown in the second embodiment, the leg portion 11 may extend in the z direction and have a substantially I-shape when viewed from the x direction. As shown in the third embodiment, a part of the leg portion 11 may be used as the substrate holding portion 15.

The holding portion 13 extends in the x direction. The holding portion 13 is provided with holding regions (protruding portion holding regions 13*a*) holding first protruding portions 21*a*3 of the first element 21*a* and second protruding portions 21*b*3 of the second element 21*b*. The protruding portion holding region 13*a* has a surface perpendicular to the z direction. The surface perpendicular to the z direction of the protruding portion holding region 13*a* limits downward movement of the first element 21*a* and the second element 21*b* in the z direction. In order to restrict the movement of the first element 21*a* in the x direction and the leftward movement in the y direction, it is desirable to form walls on a front side in the x direction, on a rear side in the x direction, and on a right side in the y direction of the protruding portion holding region 13*a* that holds the first element 21*a*. Further, in order to restrict the movement of the second element 21*b* in the x direction and the rightward movement of the second element 21*b* in the y direction, it is desirable to form walls on a front side in the x direction, on a rear side in the x direction, and on a left side in the y direction of the protruding portion holding region 13*a* that holds the second element 21*b*. In this case, the protruding portion holding region 13*a* is formed in a region recessed from the periphery of the holding portion 13.

Position at which Element Holder 10 and Eleventh Element 21*a* or the Like are in Contact At least a part of a region (protruding portion holding region 13*a*) of the element holder 10 in contact with the first element 21*a* or the second element 21*b* is located below the region of the case 5 where the projection 5*a* is provided in the z direction.

The holding portion 13 is provided with a hole (holding hole 13*b*) penetrating in the y direction. A ring-shaped convex portion 21*c*2 of a first connection terminal 21*c* is inserted into the holding hole 13*b*.

The substrate holding portion 15 extends downward in the z direction from the holding portion 13 and faces the first substrate 45*a* at a lower end thereof. The substrate holding portion 15 is located between the two leg portions 11 when viewed from the x direction. The substrate holding portion 15 holds a side surface of a second substrate 45*b*.

Antenna Element Portion 20

The antenna element portion 20 constitutes an antenna element. The antenna element portion 20 includes a first antenna 21, a second antenna 23, a third antenna 24, and a fourth antenna 25.

First Antenna 21

The first antenna 21 is, for example, an AM/FM antenna. The first antenna 21 includes an first element 21*a*, a second element 21*b*, and a first connection terminal 21*c*. For example, the first element 21*a* and the second element 21*b* are AM/FM capacitance loading elements. The first element 21*a* and the twelfth element 21*b* are formed by processing a tin-plated steel plate (conductive plate). The first element 21*a* and the second element 21*b* are inclined such that lower sides thereof are separated from each other and upper sides thereof approach each other when viewed from the x direction. The first element 21*a* has a gentle convex shape bulging in an obliquely upper right direction when viewed from the x direction. The second element 21*b* has a gentle convex shape bulging in the obliquely upper left direction when viewed from the x direction.

The first element 21*a* has a meander shape and includes at least the slit (first horizontal slit 21*a*1) extending in the substantially x direction and the horizontally long region (first horizontally long region 21*a*2) extending in the substantially x direction. The first horizontally long region 21*a*2 is provided below the first horizontal slit 21*a*1 in the z direction and is adjacent to the first horizontal slit 21*a*1. The second element 21*b* has a meander shape and includes at least the slit (twelfth horizontal slit 21*b*1) extending in the substantially x direction and the horizontally long region (second horizontally long region 21*b*2) extending in the substantially x direction. The second horizontally long region 21*b*2 is provided below the second horizontal slit 21*b*1 in the z direction and is adjacent to the second horizontal slit 21*b*1.

The first element 21*a* is provided with the first protruding portions 21*a*3 protruding leftward in the y direction from a meander region. It is desirable to provide the plurality of first protruding portions 21*a*3. In this case, at least one first protruding portion 21*a*3 of the plurality of first protruding portions 21*a*3 is provided in a region below the first horizontal slit 21*a*1 in the z direction. The first protruding portion 21*a*3 is placed in the protruding portion holding region 13*a* of the element holder 10.

An first connection region 21*a*4 is provided in the first element 21*a*. The first connection region 21*a*4 has a substantially L shape when viewed from the x direction. The substantially L shape of the first connection region 21*a*4 includes an first horizontal surface 21*a*41 that is substantially perpendicular to the z direction and extends leftward in the y direction from the meander region, and an first vertical surface 21*a*42 that is substantially perpendicular to the y direction and extends downward in the z direction from a tip of the first horizontal surface 21*a*41. An first connection hole 21*a*5 penetrating in the y direction is formed in the first vertical surface 21*a*42.

The second element 21*b* is provided with the second protruding portions 21*b*3 protruding rightward in the y direction from the meander region. It is desirable to provide the plurality of second protruding portions 21*b*3. In this case, at least one second protruding portion 21*b*3 of the plurality of second protruding portions 21*b*3 is provided in a region below the second horizontal slit 21*b*1 in the z direction. The second protruding portion 21*b*3 is placed in the protruding portion holding region 13*a* of the element holder 10.

A second connection region 21*b*4 is provided in the second element 21*b*. The second connection region 21*b*4 has a substantially L shape when viewed from the x direction. The substantially L shape of the second connection region 21*b*4 includes a second horizontal surface 21*b*41 that is substantially perpendicular to the z direction and extends rightward in the y direction from the meander shape portion, and a second vertical surface 21*b*42 that is substantially perpendicular to the y direction and extends downward in the z direction from a tip of the second horizontal surface 21*b*41. A second connection hole 21*b*5 penetrating in the y direction is formed in the second vertical surface 21*b*42.

An upper portion of the first connection terminal 21*c* is electrically connected to the first element 21*a* and the second element 21*b*. A lower portion of the first connection terminal 21*c* is electrically connected to the first substrate 45*a* via the second substrate 45*b*.

The first connection terminal 21*c* has a terminal hole portion 21*c*1 (see FIG. 9). A screw 21*d* for connecting the first element 21*a* to the second element 21*b* passes through the terminal hole portion 21*c*1. The terminal hole portion 21*c*1 is subjected to burring tap processing, and the ring-shaped convex portion 21*c*2 having a substantially hollow cylindrical shape is formed in the periphery of the terminal hole portion 21*c*1. The screw 21*d* for connecting the first element 21*a* to the second element 21*b* is screwed to a tap surface of the ring-shaped convex portion 21*c*2. The screw 21*d* is screwed into the ring-shaped convex portion 21*c*2 in a state where the screw 21*d* and the first connection terminal 21*c* sandwich the second vertical surface 21*b*42 of the second element 21*b* and the first vertical surface 21*a*42 of the first element 21*a* in the y direction (see FIG. 8). In FIG. 8, the second antenna 23 is not shown. Further, the ring-shaped convex portion 21*c*2 is inserted into the holding hole 13*b* of the holding portion 13 of the element holder 10.

Second Antenna 23

The second antenna 23 is, for example, an antenna for mobile communication (see FIG. 7). The second antenna 23 is provided at a position where the second antenna 23 is sandwiched by the first horizontally long region 21*a*2 of the first element 21*a* and the second horizontally long region 21*b*2 of the second element 21*b* sandwich in the y direction. The second antenna 23 has a surface perpendicular to the y direction. The surface of the second antenna 23 perpendicular to the y direction is held by the holding portion 13 of the element holder 10. The second antenna 23 is attached to the first substrate 45*a*.

Third Antenna 24

The third antenna 24 is, for example, an antenna for Sirius XM (SXM). The third antenna 24 is provided in front of the second antenna 23 in the x direction. The third antenna 24 is attached to the first substrate 45*a*.

Fourth Antenna 25

The fourth antenna 25 is, for example, an antenna for a global navigation satellite system (GNSS). The fourth antenna 25 is provided between the second antenna 23 and the third antenna 24. The fourth antenna 25 is attached to the first substrate 45*a*.

Substrate Portion 45

The substrate portion 45 includes the first substrate 45*a* and the second substrate 45*b*. The first substrate 45*a* has a surface perpendicular to the z direction. On the first substrate 45*a*, circuits related to the first antenna 21, the second antenna 23, the third antenna 24, and the fourth antenna 25 are mounted. The first substrate 45*a* holds the second antenna 23, the third antenna 24, the fourth antenna 25, and the second substrate 45*b*. The first substrate 45*a* is screwed to the base portion 50 (metal base 51).

The second substrate 45*b* has a surface perpendicular to the y direction. The circuit related to the first antenna 21 is mounted on the second substrate 45*b*. The second substrate 45*b* is held by the first substrate 45*a* and the substrate holding portion 15 of the element holder 10. The second substrate 45*b* may be directly attached to the first substrate 45*a* or may be attached to the first substrate 45*a* via a connection member such as an M-shaped fitting.

Dimensions of Portions

Dimensions of the portions of the vehicular antenna device 1 are determined such that a distance between the region of the convex portion 5*b* on the inner wall of the case 5 in contact with the first element 21*a* and the region of the protruding portion holding region 13*a* of the element holder 10 in contact with the first element 21*a* is slightly shorter than a distance between the region of the first element 21*a* in contact with the convex portion 5*b* and the region of the first element 21*a* in contact with the protruding portion holding region 13*a*, and a force in the z direction is applied to the first element 21*a* upon completion of assembly.

Dimensions of the portions of the vehicular antenna device 1 are determined such that a distance between the region of the convex portion 5*b* on the inner wall of the case 5 in contact with the second element 21*b* and the region of the protruding portion holding region 13*a* of the element holder 10 in contact with the second element 21*b* is slightly shorter than a distance between the region of the second element 21*b* in contact with the convex portion 5*b* and the region of the second element 21*b* in contact with the protruding portion holding region 13*a*, and a force in the z direction is applied to the second element 21*b* upon completion of assembly.

Attachment of Case 5, Element Holder 10, and First Antenna 21

Next, a configuration in which the first antenna 21 is sandwiched between the case 5 and the element holder 10 will be described. An assembly procedure will be described below, but the assembly procedure is not limited to the following. Further, FIGS. 2, 5, 8, and the like show a state in which several components are disassembled regardless of the following assembly procedure in order to facilitate understanding of an internal configuration.

The second antenna 23, the third antenna 24, and the fourth antenna 25 are attached to the first substrate 45*a*. A lower end of the first connection terminal 21*c* is hooked on the second substrate 45*b*. The first substrate 45*a* is attached to the metal base 51. The element holder 10 is attached to the metal base 51, and the second substrate 45*b* is attached to the first substrate 45*a*. The element holder 10 holds the side surface of the second substrate 45*b* and a side surface of the second antenna 23.

The first vertical surface 21*a*42 of the first element 21*a* and the second vertical surface 21*b*42 of the second element 21*b* overlap each other such that the first connection hole 21*a*5 of the first element 21*a* and the second connection hole 21*b*5 of the second element 21*b* overlap each other in the y direction. Further, in a state where the screw 21*d* and the first connection terminal 21*c* sandwich the first vertical surface 21*a*42 and the second vertical surface 21*b*42, the screw 21*d* is screwed to the ring-shaped convex portion 21*c*2 of the first connection terminal 21*c*. Thus, the first element 21*a*, the second element 21*b*, and the first connection terminal 21*c* are fixed to each other (see FIG. 8).

The ring-shaped convex portion 21*c*2 is inserted into the holding hole 13*b* of the element holder 10. The first protruding portion 21*a*3 of the first element 21*a* is placed on the protruding portion holding region 13*a* of the element holder 10. The second protruding portion 21*b*3 of the second element 21*b* is placed on the protruding portion holding region 13*a* of the element holder 10. Accordingly, the first antenna 21 is in a state of being attached to the element holder 10 (see FIG. 7).

The case 5 is screwed to the metal base 51 with the pad 7 sandwiched therebetween. At this time, the upper end of the first element 21*a* and the upper end of the second element 21*b* are in contact with the convex portion 5*b* of the case 5. The projection 5*a* of the case 5 is inserted into the first horizontal slit 21*a*1 of the first element 21*a* and the second horizontal slit 21*b*1 of the second element 21*b*. The upper end of the first horizontally long region 21*a*2 of the first element 21*a* and the upper end of the second horizontally long region 21*b*2 of the second element 21*b* are in contact with the flat surface portion 5*a*1 of the projection 5*a*. The first element 21*a* and the second element 21*b* are in a state of being sandwiched between the convex portion 5*b* and the protruding portion holding region 13*a* in the z direction (see FIG. 6). An upward force in the z direction is applied to the first horizontally long region 21*a*2 of the first element 21*a* and the second horizontally long region 21*b*2 of the second element 21*b*, and the projection 5*a* restricts the upward movement in the z direction.

Effect of Attaching First Antenna 21 to Element Holder 10

The first antenna 21 can be easily attached to another member (here, the element holder 10) compared with a configuration in which the first antenna 21 is attached to an inner wall of the outer cover 3, an outer wall of the case 5, or the like. Since the first antenna 21 is accommodated in a waterproof region (a region surrounded by the case 5 and the base portion 50), a degree of freedom of material selection of the first element 21*a* or the like is increased compared with a configuration in which the first antenna 21 is provided outside the case 5. Further, electrical connection between the first antenna 21 and the first substrate 45*a* can also be easily performed.

Effect of Sandwiching and Holding First Element 21*a* and Second Element 21*b*

The first element 21*a* is sandwiched in the z direction by the convex portion 5*b* of the inner wall of the case 5 and the protruding portion holding region 13*a* of the element holder 10. The second element 21*b* is sandwiched in the z direction by the convex portion 5*b* of the inner wall of the case 5 and the protruding portion holding region 13*a* of the element holder 10. The convex portion 5*b* is located above the projection 5*a* in the z direction. The protruding portion holding region 13*a* is located below the projection 5*a* in the z direction. Therefore, the antenna element can be fixed to the holding member without using many fastening members such as screws. Further, since the case 5 and the element holder 10 sandwich the antenna element in a state where regions in contact with the antenna element (the first element 21*a* and the second element 21*b*) are separated from each other, the antenna element can be stably held, compared with a configuration where the case 5 and the element holder 10 sandwich the antenna element in a state where the regions in contact with the antenna element are close to each other.

Effect of Providing Projections 5*a*

Although a force is applied to the first element 21*a* and the second element 21*b* from above and below, it is easy to keep the width of the slit constant, and the shapes (meander shapes) of the elements are hardly deformed. Therefore, electrical performance of the first antenna 21 can be easily maintained constant compared with a configuration in which the first element 21*a* and the second element 21*b* are deformed in shapes of the elements (meander shapes) by the force applied from above and below.

Effect of Connection Using Holding Member Subjected to Burring Tap Processing

One of connection objects (first connection terminal 21*c*) is subjected to the burring tap processing to form the ring-shaped convex portion 21*c*2, and the remaining connection objects (the first element 21*a* and the second element 21*b*) are sandwiched by using the screw 21*d* and the ring-shaped convex portion 21*c*2. Accordingly, the electrical connection and fixation of the connection object can be easily performed with a small number of components.

Application Example of Members Subjected to Burring Tap Processing

In the first embodiment, the example in which the terminal hole portion 21*c*1 of the first connection terminal 21*c* is subjected to the burring tap processing has been described. However, the first connection hole 21*a*5 of the first element 21*a* or the second connection hole 21*b*5 of the second element 21*b* may be subjected to the burring tap processing.

Application Example of Holding Direction

In the first embodiment, the example in which the case 5 and the element holder 10 sandwich the antenna element (the first element 21*a* or the like) in the z direction has been described. However, the direction in which the element holder 10 sandwiches the antenna element (the first element 21*a* or the like) may be another direction. Also in this case, at least a part of the region (convex portion 5*b*) of the case 5 in contact with the antenna element (the first element 21*a* or the like) is located further toward one side in the direction in which the antenna element is sandwiched than the region where the projection 5*a* is provided. At least a part of the region (protruding portion holding region 13*a*) of the element holder 10 in contact with the antenna element is located further toward the other side in the sandwiching direction than the region where the projection 5*a* is provided.

Application Example of Base Portion 50, Second Embodiment

In the first preferred embodiment, the example in which the base portion 50 is implemented by the metal base 51 has been described. However, the base portion 50 may be partially or entirely made of a resin (see FIGS. 10 to 13).

Figure 11:
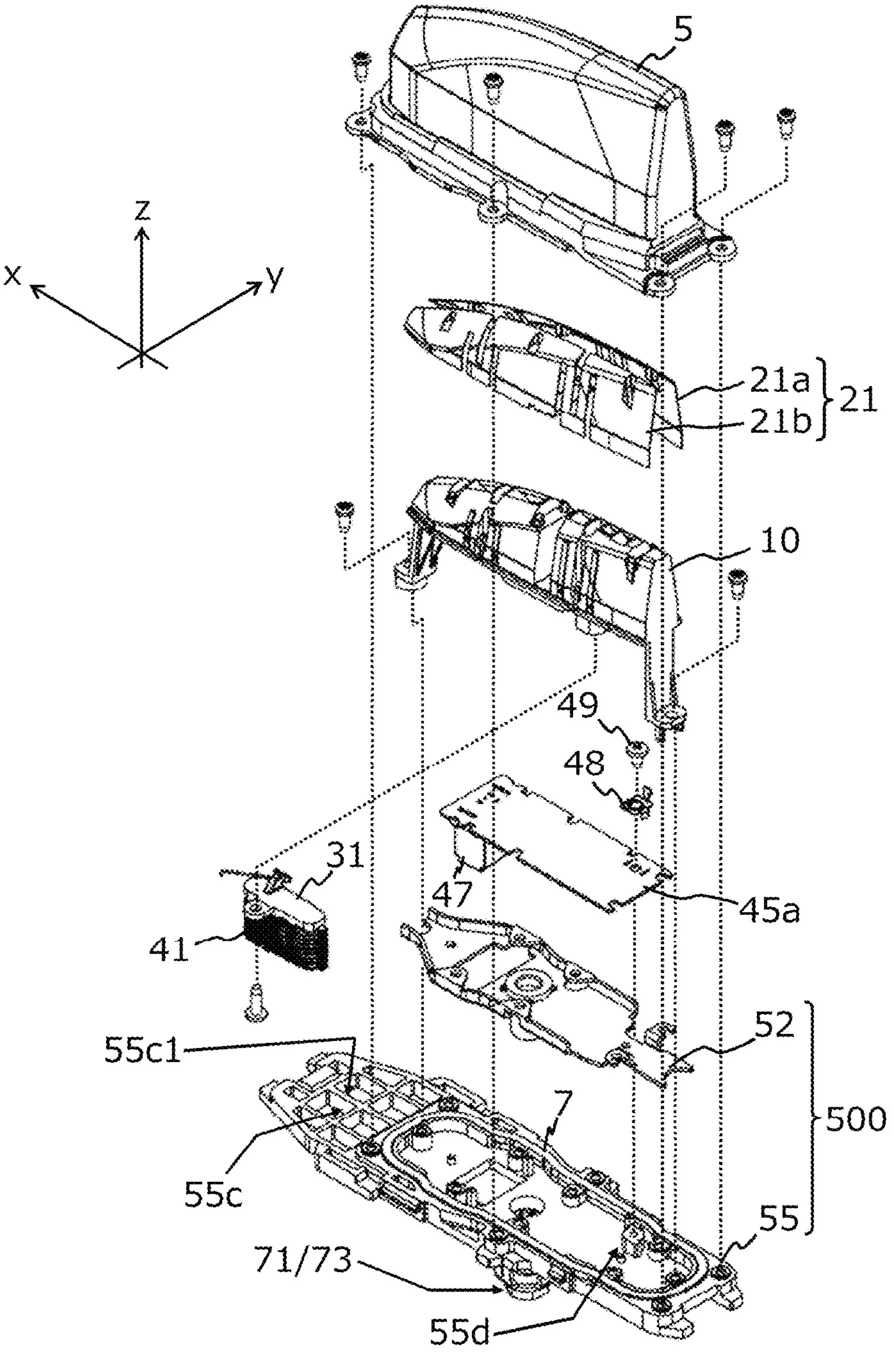
FIG. 11 is a perspective view showing a state before the case, a first antenna, an element holder, a first helical element holder, a first substrate, and a metal plate are attached to a resin base in the second embodiment, when viewed from an upper rear side.

A base portion 500 of the second embodiment includes the metal plate 52 and the resin base 55 (see FIG. 11). The metal plate 52 is formed of one plate-shaped metal member, and is used as a ground plate of the vehicular antenna device 1. The metal plate 52 is formed, for example, on the resin base 55 so as to be accommodated inside a region where the pad 7 is disposed. The resin base 55 holds the element holder 10 and the metal plate 52. The metal plate 52 holds the first substrate 45*a*. Members constituting the vehicular antenna device 1 of the second embodiment that are functionally common to the members constituting the vehicular antenna device 1 of the first embodiment are denoted by the same reference numerals as those of the vehicular antenna device 1 of the first embodiment.

Figure 12:
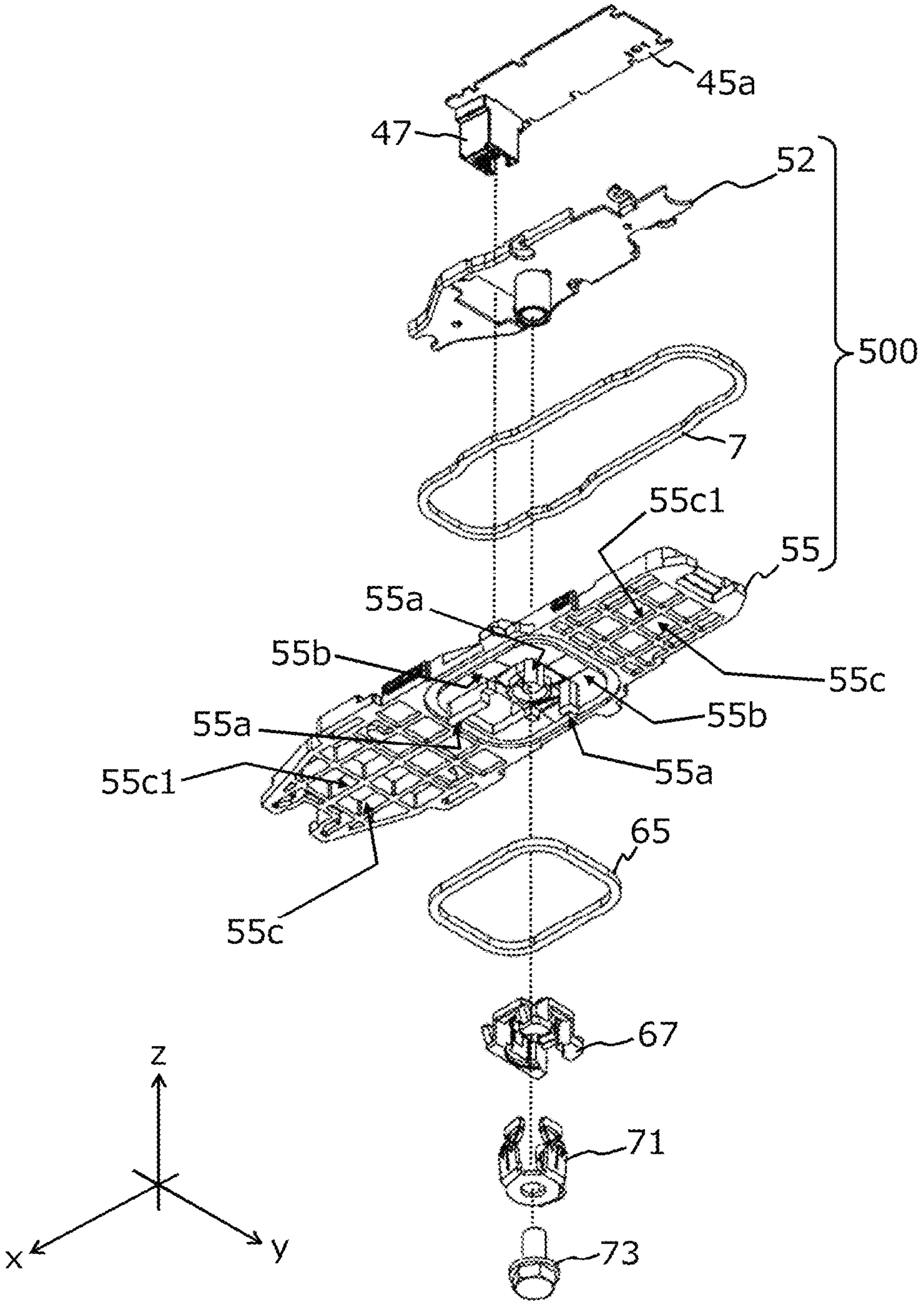
FIG. 12 is a perspective view showing a state before the first substrate, the metal plate, a pad, a waterproof member, a temporary fixing tool, a claw-equipped washers, and a bolt are attached to the resin base in the second embodiment, when viewed from a lower rear side.
Figure 13:
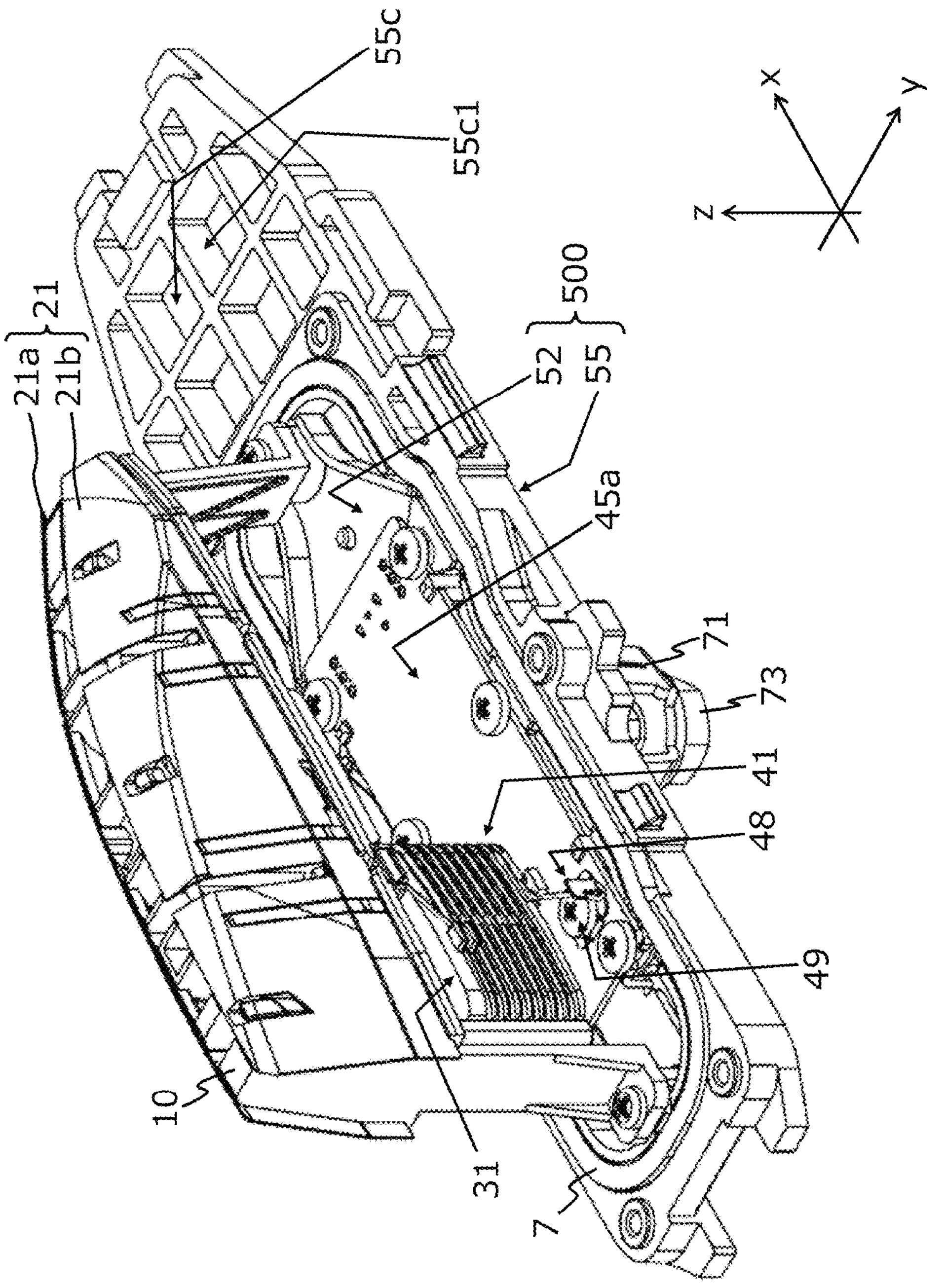
FIG. 13 is a perspective view showing a state after the first antenna, the element holder, the first substrate, and the base portion are assembled in the second embodiment, when viewed from the upper rear side.
Figure 14:
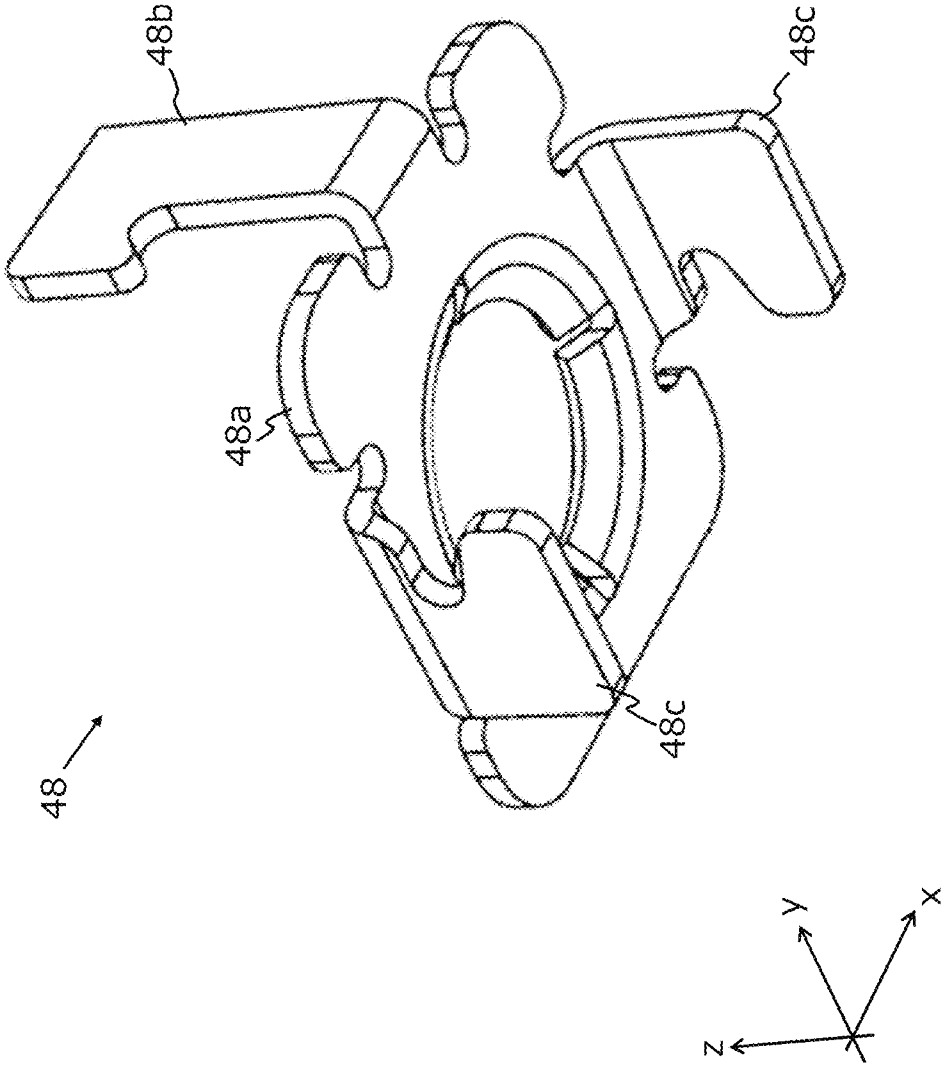
FIG. 14 is a perspective view of a connection fitting in second and third embodiments when viewed from a lower side.

In a region of a lower surface of the resin base 55 facing an attachment hole of a roof of a vehicle, a rotation stop portion (second rotation stop portion 55*a*) protruding downward in the z direction and passing through the attachment hole is provided (see FIG. 12). The second rotation stop portion 55*a* is integrally formed with the lower surface of the resin base 55. The second rotation stop portion 55*a* comes into contact with a corner region of the attachment hole of the roof of the vehicle, and prevents rotation of the base portion 500 by rotation of the bolt 73.

A flat surface region is formed on the lower surface of the resin base 55 between a region facing the attachment hole of the roof of the vehicle and a region to which the waterproof member 65 is attached. When the vehicular antenna device 1 is fixed to the roof of the vehicle, the flat surface region (second roof contact surface 55*b*) is in contact with the roof.

A region of the resin base 55 in front of the region to which the waterproof member 65 is attached in the x direction and a region of the lower surface of the resin base 55 behind the region to which the waterproof member 65 is attached in the x direction are thinned (hollowed), and a rib 55*cl* is formed between adjacent thinned regions 55*c*. The thinning may be performed so as to penetrate the resin base 55 in the z direction, or may be performed on at least one of an upper portion and a lower portion of the resin base 55 without penetrating the resin base 55. That is, at least one of the upper surface and the lower surface of the resin base 55 is thinned. In the second embodiment, the example in which the region of the resin base 55 in front of the region to which the waterproof member 65 is attached in the x direction is thinned such that the resin base 55 is penetrated in the z direction is shown. Further, an example is shown in which only the lower portion of the resin base 55 in the region of the resin base 55 behind the region to which the waterproof member 65 is attached in the x direction is thinned.

Further, a connection fitting receiving portion 55*d* for screwing a connection fitting 48 is provided on the upper surface of the resin base 55. Details of the connection fitting receiving portion 55*d* will be described later.

Effect of Forming at Least Part of Base Portion 500 from Resin

The weight of the vehicular antenna device 1 can be reduced compared with a configuration in which the entire base portion 500 is made of metal. Further, it is easy to perform screwing while avoiding the region of the base portion 500 made of the metal, and it is possible to increase the number of portions that can be screwed from above in the z direction. Accordingly, the assembly work is facilitated as compared with a configuration in which the screwing is performed from the lower surface of the first substrate 45*a* or the like.

Effect of Thinning Part of Resin Base 55

The weight of the vehicular antenna device 1 can be reduced as compared with a configuration in which thinning is not performed.

Advantageous Effect of Providing Second Rotation Stop Portion 55A Made of Resin In the case where the rotation stop portion is made of the metal as in the first rotation stop portion 51*a*, when the rotation stop portion comes into contact with the roof of the vehicle, electrical performance of the vehicular antenna device 1 may be affected. In the case where the rotation stop portion, such as the second rotation stop portion 55*a*, is made of a resin, when the rotation stop portion comes into contact with the roof of the vehicle, the electrical performance of the vehicular antenna device 1 is hardly affected.

Effect of Providing Second Roof Contact Surface 55B Made of Resin

When the contact surface with the roof is made of the metal as in the first roof contact surface 51*b*, the electrical performance of the vehicular antenna device 1 may change depending on a degree of contact between the contact surface and the roof. In the case where the contact surface with the roof, such as the second roof contact surface 55*b*, is made of a resin, the electrical performance of the vehicular antenna device 1 is less likely to change depending on a degree of contact between the contact surface and the roof.

Application Example of Connection Method between First Antenna 21 and First Substrate 45a In the first embodiment, the example in which the first antenna 21 and the first substrate 45*a* are connected to each other via the second substrate 45*b* has been described. However, the first antenna 21 and the first substrate 45*a* may be connected via a helical element (see FIGS. 11 and 13 to 15). The vehicular antenna device 1 of the second embodiment includes a first helical element holder 31, a first helical element 41, and a connection fitting 48.

First Helical Element Holder 31 and First Helical Element 41

The first helical element holder 31 holds the first helical element 41. The first helical element holder 31 is disposed on the first substrate 45*a* and below the first antenna 21. One end portion of the first helical element 41 is electrically connected to the first antenna 21. The other end portion of the first helical element 41 is electrically connected to the first substrate 45*a* via the connection fitting 48.

Connection Fitting 48

The connection fitting 48 of the second embodiment is used for connection between the first helical element 41 and the first substrate 45*a*. The connection fitting 48 includes a screw fixing portion 48*a*, a hook 48*b*, and bending stop portions 48*c* (see FIG. 14).

The screw fixing portion 48*a* has a surface perpendicular to the z direction, and a hole through which a shaft portion of a connection fitting screw 49 passes is formed in the surface. The hole is used for screwing using the connection fitting screw 49.

The hook 48*b* extends upward in the z direction from an end portion of the screw fixing portion 48*a* (for example, one of end portions in the y direction), and is used to hook the other end portion of the first helical element 41. The hook 48*b* of the second embodiment has a substantially L shape when viewed from the y direction.

The bending stop portions 48*c* extend downward in the z direction from the end portions of the screw fixing portion 48*a* (for example, both of the end portions in the x direction). A tip portion of the bending stop portion 48*c* is subjected to bending processing (clinching). The bending processing is used to prevent the connection fitting 48 from coming off from a member (for example, the first substrate 45*a*) adjacent to a lower side of the connection fitting 48 in the z direction. After the bending processing, the bending stop portion 48*c* is fixed to the member adjacent to the lower side of the connection fitting 48 in the z direction by soldering. The bending stop portion 48*c* of the second embodiment has a substantially L shape when viewed from the x direction.

In the fixing using the connection fitting 48, at least one of the screwing using the connection fitting screw 49 and the bending processing of the bending stop portions 48*c* is performed. When the bending processing is performed using the bending stop portions 48*c*, the fastening by the connection fitting screw 49 may not be performed. Further, when the connection fitting screw 49 is used for screwing, the bending processing of the bending stop portions 48*c* may not be performed. In the second embodiment, an example in which the screwing is performed using the connection fitting screw 49 and the bending processing using the bending stop portions 48*c* is not performed is described.

Figure 15:
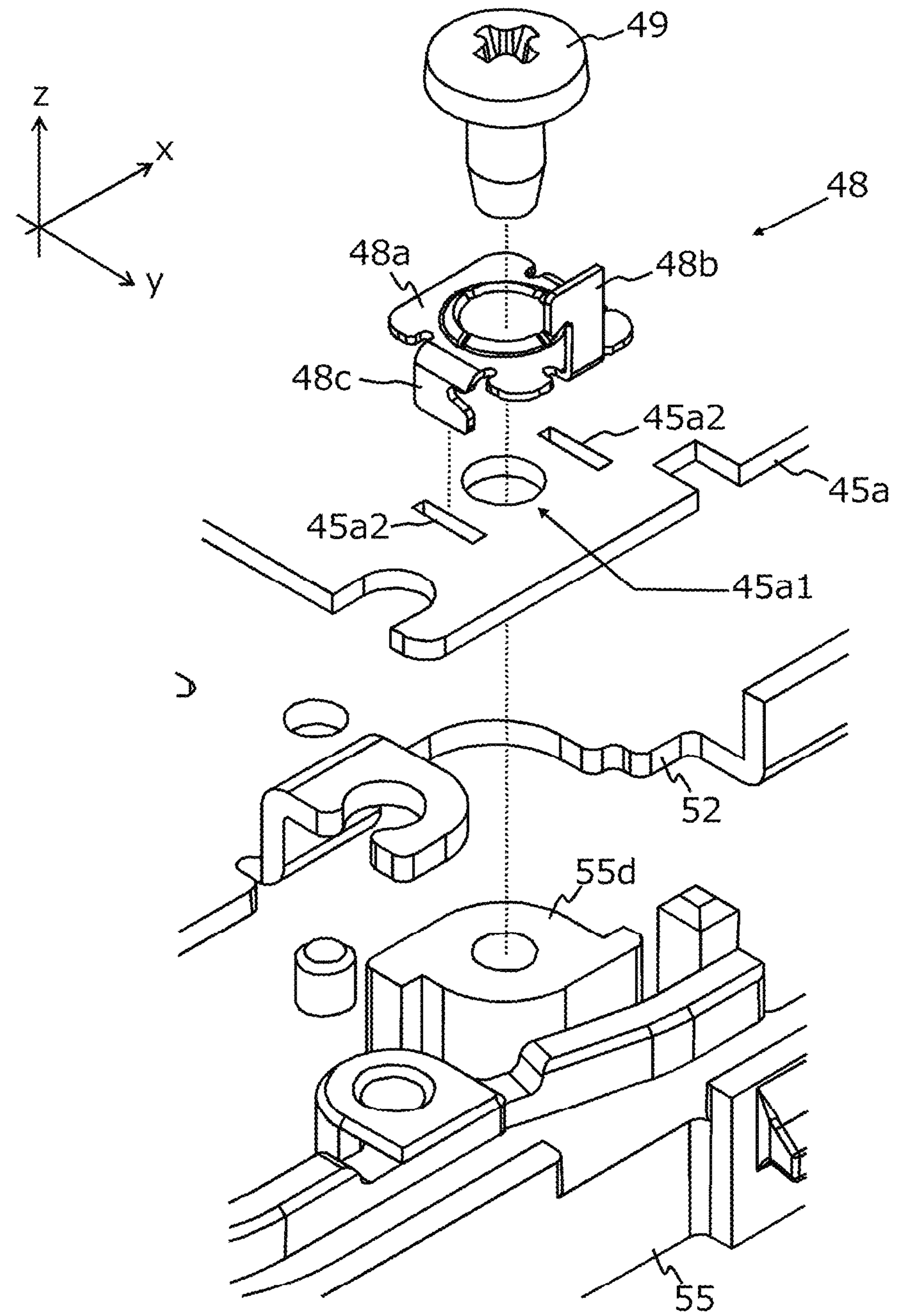
FIG. 15 is an enlarged perspective view showing a state before the connection fitting screw, the connection fitting, the first substrate, and the metal plate are attached to the resin base in the second embodiment, when viewed from an upper side.

The first substrate 45*a* of the second embodiment is provided with holes (a first hole 45*a*1 and second holes 45*a*2) for attaching the connection fittings 48 (see FIG. 15). The first hole 45*a*1 is a circular hole through which the shaft portion of the connection fitting screw 49 passes. The second hole 45*a*2 is a substantially rectangular hole through which the bending stop portion 48*c* passes.

Effects of Providing Connection Fitting 48

By performing at least one of the screwing using the connection fitting screw 49 and the bending processing (clinching) using the bending stop portions 48*c*, an adjacent connection target member (for example, the first substrate 45*a*) can be fixed. The fixing method can be selectively used according to a connection condition of the adjacent connection target member or the like by the one connection fitting 48. In the second embodiment, there is little possibility that the connection fitting screw 49 formed of the conductive member is electrically connected to a conductive member (for example, the metal plate 52) different from the adjacent connection target member. Accordingly, the screwing using the connection fitting screw 49 is performed without performing the bending processing using the bending stop portions 48*c*. In the third embodiment to be described later, the connection fitting screw 49 may be electrically connected to a conductive member (for example, a rear metal plate 52*b*) different from the adjacent connection target member. Accordingly, the fixing using the bending processing of the bending stop portions 48*c* is performed without using the connection fitting screw 49.

Application Example of Antenna, Third Embodiment

In the first embodiment, the example in which the entire antenna element portion 20 (the first antenna 21 and the like) is accommodated inside the outer cover 3 and inside the case 5 has been described. However, a part (fifth antenna 220) of the antenna element portion 20 may be provided inside the outer cover 3 and outside the case 5 (see FIG. 16).

The vehicular antenna device 1 of the third embodiment includes a second helical element holder 32, a second helical element 42, an element holder 100, and an antenna element portion 200. The antenna element portion 200 of the third embodiment includes a first antenna 210 and the fifth antenna 220. Members constituting the vehicular antenna device 1 of the third embodiment that are functionally common to the members constituting the vehicular antenna device 1 of the first embodiment or the second embodiment are denoted by the same reference numerals as those of the vehicular antenna device 1 of the first embodiment or the second embodiment.

The first antenna 210 of the third embodiment corresponds to the first antenna 21 of the first embodiment. Members constituting the first antenna 210 of the third embodiment that are functionally common to the members constituting the first antenna 21 of the first embodiment are denoted by the same reference numerals as those of the first antenna 21 of the first embodiment. The element holder 100 of the third embodiment corresponds to the element holder 10 of the first embodiment. Members constituting the element holder 100 of the third embodiment that are functionally common to the members constituting the element holder 10 of the first embodiment are denoted by the same reference numerals as those of the element holder 10 of the first embodiment.

Fifth Antenna 220

The fifth antenna 220 is provided behind the first antenna 210 in the x direction. The fifth antenna 220 is, for example, a DAB antenna. The fifth antenna 220 includes a first antenna element 22*a*, a second antenna element 22*b*, and a second connection terminal 22*c*. The first antenna element 22*a* and the second antenna element 22*b* are formed by processing a SUS material (conductive plate). The first antenna element 22*a* and the second antenna element 22*b* are inclined such that lower portions thereof are separated from each other and upper portions thereof approach each other when viewed from the x direction. The first antenna element 22*a* has a gentle convex shape bulging in an obliquely upper right direction when viewed from the x direction. The second antenna element 22*b* has a gentle convex shape bulging in the obliquely upper left direction when viewed from the x direction. The first antenna element 22*a* and the second antenna element 22*b* sandwich the case 5 in the y direction. The second connection terminal 22*c* is provided inside the case 5.

The first antenna element 22*a* has a meander shape. The first antenna element 22*a* is screwed to a right outer wall of the case 5 in the y direction. The second antenna element 22*b* has a meander shape. The second antenna element 22*b* is screwed to a left outer wall of the case 5 in the y direction. The first antenna element 22*a* and the second antenna element 22*b* are electrically connected to the second helical element 42 via the second connection terminal 22*c*.

Second Helical Element Holder 32 and Second Helical Element 42

The second helical element holder 32 is provided behind the element holder 10 in the x direction. The second helical element holder 32 holds the second helical element 42. The second helical element holder 32 is disposed on the first substrate 45*a* and below the fifth antenna 220. One end portion of the second helical element 42 is electrically connected to the fifth antenna 220. The other end portion of the second helical element 42 is electrically connected to the first substrate 45*a* via the connection fitting 48.

The connection fitting 48 of the third embodiment is used for connection between the second helical element 42 and the first substrate 45*a*. In order to avoid electrical connection with a metal plate 520 (the rear metal plate 52*b*), the connection fitting 48 and the first substrate 45*a* are fixed to each other by using the bending processing of the bending stop portions 48*c* without using the connection fitting screw 49. Therefore, in the first substrate 45*a* of the third embodiment, the second holes 45*a*2 are formed, and the first hole 45*a*1 is not formed.

Application Example of Holding of Protruding Portions by Element Holder 100

In the first embodiment, the example in which surfaces of the first protruding portions 21*a*3 of the first element 21*a* and the second protruding portions 21*b*3 of the second element 21*b*, which are substantially perpendicular to the z direction, are held by the protruding portion holding regions 13*a* of the element holder 10 has been described. However, the other surfaces of the first protruding portions 21*a*3 and the second protruding portions 21*b*3 may be held by the protruding portion holding regions 13*a*.

The protruding portion holding region 13*a* of the element holder 100 of the third embodiment is recessed downward in the z direction. The first protruding portion 21*a*3 of the first element 21*a* of the third embodiment includes a first region protruding leftward in the y direction and a second region protruding downward in the z direction from a tip of the first region. The second region of the first protruding portion 21*a*3 is inserted into a region recessed downward in the z direction of the protruding portion holding region 13*a*. Accordingly, the first element 21*a* is held by the holding portion 13. The second protruding portion 21*b*3 of the second element 21*b* according to the third embodiment includes a first region protruding rightward in the y direction and a second region protruding downward in the z direction from a tip of the first region. The second region of the second protruding portion 21*b*3 is inserted into a region recessed downward in the z direction of the protruding portion holding region 13*a*. Accordingly, the second element 21*b* is held by the holding portion 13.

Application Example of Metal Plate 52

In the second embodiment, the example in which the metal plate 52 is formed of one plate-shaped metal member has been described. However, the metal plate 52 may be formed of a plurality of plate-shaped metal members. The metal plate 520 of the third embodiment includes a front metal plate 52*a* and a rear metal plate 52*b*.

While certain embodiments of the present invention are described, these embodiments are presented by way of example only, and are not intended to limit the scope of the present invention. These embodiments can be implemented by various other forms, and various omissions, replacements, and modifications can be made without departing from the gist of the invention. These embodiments and modifications thereof are included in the scope and the gist of the invention, and are included in a scope equivalent to the inventions described in the claims.

According to the present specification, the following aspects are provided.

Aspect 1

An vehicular antenna device includes an antenna element portion including an antenna element, an element holder configured to hold the antenna element, and a case configured to cover at least the antenna element and the element holder. The antenna element is sandwiched between the element holder and the case. The antenna element includes a slit extending in a second direction perpendicular to a first direction in which the element holder and the case sandwich the antenna element. A projection to be inserted into the slit is provided on an inner wall of the case. At least a part of a region of the case in contact with the antenna element is located further toward one side in the first direction than a region where the projection is provided. At least a part of a region of the element holder in contact with the antenna element is located further toward the other side in the first direction than the region where the projection is provided.

According to Aspect 1, the antenna element can be fixed to the holding member without using many fastening members such as screws. Further, the antenna element can be stably held by sandwiching the antenna element between the case and the element holder in a state where regions in contact with the antenna element are separated from each other. Although a force is applied to the antenna element, the width of the slit is easily kept constant, and the shape of the element is hardly deformed. Therefore, electrical performance of the antenna can be easily maintained constant.

Aspect 2

The case preferably restricts movement of the antenna element toward the one side in the first direction. The element holder restricts movement of the antenna element toward the other side in the first direction.

Aspect 3

Further, the projection is preferably formed with a flat surface portion perpendicular to the first direction and a tip portion extending from a tip of the flat surface portion to the one side in the first direction. A horizontally long region adjacent to the slit of the antenna element is in contact with the flat surface portion.

Aspect 4

Further, the vehicular antenna device preferably includes a base portion. At least one of an upper surface and a lower surface of the base portion is thinned.

According to Aspect 4, the weight of the vehicular antenna device can be reduced as compared with a configuration in which thinning is not performed.

Aspect 5

Further, the vehicular antenna device preferably includes a base portion. The base portion includes a rotation stop portion protruding downward and passing through an attachment hole of a roof of a vehicle.

According to Aspect 5, the rotation stop portion prevents rotation of the base portion.

Aspect 6

Further, the base portion preferably includes a resin base. A flat surface region in contact with the roof is formed on a lower surface of the resin base between a region facing the attachment hole and a region to which a waterproof member is attached.

According to Aspect 6, in the case where a contact surface with the roof is made of a resin, the electrical performance of the vehicular antenna device is less likely to change depending on a degree of contact between the contact surface and the roof.

Aspect 7

Further, the vehicular antenna device preferably includes a first substrate, and a connection fitting used for electrical connection between the antenna element and the first substrate and configured to be attached to the first substrate. The connection fitting includes a screw fixing portion in which a hole for screwing is formed and a bending stop portion. The connection fitting is attached to the first substrate by at least one of fixing by screwing through the hole for screwing and fixing by bending processing of the bending stop portion.

According to Aspect 7, the fixing method can be selectively used according to a connection condition of an adjacent connection target member or the like by the one connection fitting.

Aspect 8

Further, the antenna element portion preferably includes a first antenna element and a second antenna element as the antenna element. The antenna element portion includes a connection terminal used for electrical connection between the antenna element and the first substrate. The first antenna element, the second antenna element, and the connection terminal are attached by screwing using a region subjected to burring tap processing in at least one of the first antenna element, the second antenna element, and the connection terminal.

According to Aspect 8, electrical connection and fixation of the connection object can be easily performed with a small number of components.

Aspect 9

Further, the vehicular antenna device preferably includes a first substrate and a base portion configured to hold the first substrate. The antenna element and the element holder are accommodated in a region surrounded by the base portion and the case.

Aspect 10

More preferably, the base portion includes a metal plate and a resin base that holds the metal plate.

According to Aspect 10, the weight of the vehicular antenna device can be reduced as compared with a configuration in which the entire base portion is made of metal.

REFERENCE SIGNS LIST

1 vehicular antenna device
3 outer cover
5 case
5*a* projection (side stopper)
5*a*1 flat surface portion
5*a*2 tip portion
5*b* convex portion (upper stopper)
7 pad
10 (100) element holder
11 leg portion
13 holding portion
13*a* protruding portion holding region
13*b* holding hole
15 substrate holding portion
20 (200) antenna element portion
21 (210) first antenna
21*a* first element
21*a*1 first horizontal slit
21*a*2 first horizontally long region
21*a*3 first protruding portion
21*a*4 first connection region
21*a*41 first horizontal surface
21*a*42 first vertical surface
21*a*5 first connection hole
21*b* second element
21*b*1 second horizontal slit
21*b*2 second horizontally long region
21*b*3 second protruding portion
21*b*4 second connection region
21*b*41 second horizontal surface
21*b*42 second vertical surface
21*b*5 second connection hole
21*c* first connection terminal
21*c*1 terminal hole portion
21*c*2 ring-shaped convex portion
21*d* screw
22*a* first antenna element
22*b* second antenna element
22*c* second connection terminal
23 second antenna (Tel)
24 third antenna (SXM)
25 fourth antenna (GPS)
220 fifth antenna (DAB)
31 first helical element holder
32 second helical element holder
41 first helical element
42 second helical element
45 substrate portion
45*a* first substrate
45*a*1 first hole
45*a*2 second hole
45*b* second substrate
47 connector
48 connection fitting
48*a* screw fixing portion
48*b* hook
48*c* bending stop portion
49 connection fitting screw
50 (500) base portion
51 metal base
51*a* first rotation stop portion
51*b*: first roof contact surface
52 (520) metal plate
52*a* front metal plate
52*b* rear metal plate
55 resin base
55*a* second rotation stop portion
55*b* second roof contact surface
55*c* thinned region
55*c*1 rib
55*d*: connection fitting receiving portion
65 waterproof member
67 temporary fixing tool
71 claw-equipped washer
73 bolt

The invention claimed is:

1. A vehicular antenna device comprising:

an antenna element portion including an antenna element;

an element holder configured to hold the antenna element; and a case configured to cover at least the antenna element and the element holder, wherein the antenna element is sandwiched between the element holder and the case, the antenna element includes an opening extending in a second direction perpendicular to a first direction in which the element holder and the case sandwich the antenna element, a projection to be inserted into the opening is provided on an inner wall of the case, at least a part of a region of the case in contact with the antenna element is located further toward one side in the first direction than a region where the projection is provided, and at least a part of a region of the element holder in contact with the antenna element is located further toward an other side in the first direction than the region where the projection is provided.

2. The vehicular antenna device according to claim 1, wherein the case restricts movement of the antenna element toward the one side in the first direction, and the element holder restricts movement of the antenna element toward the other side in the first direction.

3. The vehicular antenna device according to claim 1, wherein the projection is formed with a flat surface portion perpendicular to the first direction and a tip portion extending from a tip of the flat surface portion to the one side in the first direction, and a horizontal region adjacent to the opening of the antenna element is in contact with the flat surface portion.

4. The vehicular antenna device according to claim 1, further comprising:

a base portion, wherein at least one of an upper surface and a lower surface of the base portion is thinned.

5. The vehicular antenna device according to claim 1, further comprising:

a base portion, wherein the base portion includes a rotation stop portion protruding downward and passing through an attachment hole of a roof of a vehicle.

6. The vehicular antenna device according to claim 5, wherein the base portion includes a resin base, and a flat surface region in contact with the roof is formed on a lower surface of the resin base between a region facing the attachment hole and a region to which a waterproof member is attached.

7. The vehicular antenna device according to claim 1, further comprising:

a first substrate; and a connection fitting used for electrical connection between the antenna element and the first substrate and configured to be attached to the first substrate, wherein the connection fitting includes a screw fixing portion in which a hole for screwing is formed and a bending stop portion, and the connection fitting is attached to the first substrate by at least one of fixing by screwing through the hole for screwing and fixing by bending processing of the bending stop portion.

8. The vehicular antenna device according to claim 4, wherein the antenna element portion includes a first element and a second element as the antenna element, the antenna element portion includes a connection terminal used for electrical connection between the antenna element and a first substrate, and the first element, the second element, and the connection terminal are attached by screwing using a region subjected to burring tap processing in at least one of the first element, the second element, and the connection terminal.

* * * * *